United States Patent
Curtis et al.

(10) Patent No.: US 9,968,120 B2
(45) Date of Patent: May 15, 2018

(54) HOMOGENIZED FORMULATIONS CONTAINING MICROCAPSULES AND METHODS OF MAKING AND USING THEREOF

(75) Inventors: Jonathan Michael Curtis, Halifax (CA); Wei Zhang, Halifax (CA); Sharon Ann Spurvey, Middle Sackville (CA); Suzelle Rejeanne Robert, Saulnierville (CA)

(73) Assignee: DSM NUTRITIONAL PRODUCTS AG, Kaiseraugst (CH)

( * ) Notice: Subject to any disclaimer, the term of this patent is extended or adjusted under 35 U.S.C. 154(b) by 2470 days.

(21) Appl. No.: 11/435,605

(22) Filed: May 17, 2006

(65) Prior Publication Data

US 2007/0269566 A1    Nov. 22, 2007

(51) Int. Cl.
| | |
|---|---|
| *B01J 13/00* | (2006.01) |
| *A23L 1/29* | (2006.01) |
| *A23C 9/13* | (2006.01) |
| *A23C 9/152* | (2006.01) |
| *A23P 10/30* | (2016.01) |
| *A23L 33/00* | (2016.01) |

(52) U.S. Cl.
CPC ............ *A23L 1/296* (2013.01); *A23C 9/1315* (2013.01); *A23C 9/1528* (2013.01); *A23L 33/40* (2016.08); *A23P 10/30* (2016.08); *A23C 2260/152* (2013.01); *A23V 2002/00* (2013.01)

(58) Field of Classification Search
CPC ........ A23L 1/0029; A23L 1/296; A23L 33/40; A23C 11/103; A23C 9/1315; A23C 9/1528; A23P 10/30; A23V 2002/00
USPC ...................................... 264/4.32
See application file for complete search history.

(56) References Cited

U.S. PATENT DOCUMENTS

| | | | |
|---|---|---|---|
| 2,800,457 A | 7/1957 | Green et al. ............ | 428/402.2 |
| 2,800,458 A | 7/1957 | Green | |

(Continued)

FOREIGN PATENT DOCUMENTS

| | | |
|---|---|---|
| CA | 2447002 | 4/2003 |
| DE | 1035319 | 7/1958 |

(Continued)

OTHER PUBLICATIONS

APV Homogenizers Rannie and Gaulin, SPX Corporation, (© 2000, 2008 SPX Corporation—month unavailable), obtained online @ http://www.keyindustrial.com/homogenizers%20&%20fillers/sub%20links/homogenizers/PDFs/intro/APV%20SPX%20Homogenizer%20General%20Brochure.pdf , (downloaded Aug. 31, 2010) pp. 1-16.*

(Continued)

*Primary Examiner* — Daniel S Metzmaier
(74) *Attorney, Agent, or Firm* — Nixon & Vanderhye P.C.

(57) ABSTRACT

Disclosed are homogenized formulations that comprise microcapsules, wherein the microcapsules comprise an agglomeration of primary microcapsules and a loading substance, where each individual primary microcapsule has a primary shell, and the loading substance is encapsulated by the primary shell, and wherein the agglomeration is encapsulated by an outer shell. Also, disclosed are methods of making and using homogenized formulations by providing a pre-homogenized composition comprising one or more microcapsules and then homogenizing the composition. Some specific homogenization processes described are ultrasonic and pressure-based homogenizations.

38 Claims, 3 Drawing Sheets

(56) References Cited

U.S. PATENT DOCUMENTS

| | | | | |
|---|---|---|---|---|
| 2,897,119 A * | | 7/1959 | Dunn | A61K 31/59 424/489 |
| 3,041,289 A | | 6/1962 | Katchen et al. | |
| 3,179,600 A | | 4/1965 | Brockett | 503/200 |
| 3,190,837 A * | | 6/1965 | Brynko | A61K 9/50 264/4.3 |
| 3,317,434 A | | 5/1967 | Veis et al. | |
| 3,526,682 A | | 9/1970 | Timreck | 264/4 |
| 3,697,437 A | | 10/1972 | Fogel et al. | 427/213.33 |
| 4,010,038 A | | 3/1977 | Iwasaki et al. | |
| 4,217,370 A | | 8/1980 | Rawlings et al. | 426/98 |
| 4,219,439 A | | 8/1980 | Miyake et al. | 264/4.4 |
| 4,222,891 A | | 9/1980 | Okimoto et al. | 264/4.4 |
| 4,273,672 A | | 6/1981 | Vassiliades | 264/4.1 |
| 4,485,172 A | | 11/1984 | Gierhart | |
| 4,568,559 A * | | 2/1986 | Nuwayser | A61K 9/1647 424/493 |
| 4,623,588 A * | | 11/1986 | Nuwayser | A61K 9/1647 424/497 |
| 4,670,247 A | | 6/1987 | Scialpi | 424/16 |
| 4,695,466 A | | 9/1987 | Morishita et al. | 424/456 |
| 4,744,933 A | | 5/1988 | Rha et al. | 264/4.3 |
| 4,749,620 A | | 6/1988 | Rha et al. | 428/402.2 |
| 4,808,408 A | | 2/1989 | Baker et al. | 424/408 |
| 4,851,339 A | | 7/1989 | Hills | 435/67 |
| 4,861,627 A | | 8/1989 | Mathiowitz et al. | 427/213.31 |
| 4,867,986 A | | 9/1989 | Desai et al. | 424/464 |
| 4,891,172 A | | 1/1990 | Matsushita et al. | 264/4.33 |
| 4,895,725 A | | 1/1990 | Kantor et al. | 424/455 |
| 4,923,855 A | | 5/1990 | Jensen | 514/188 |
| 4,946,624 A | | 8/1990 | Michael | 501/101 |
| 4,954,492 A | | 9/1990 | Jensen | 514/188 |
| 4,963,367 A | | 10/1990 | Ecanow | 424/485 |
| 5,035,896 A | | 7/1991 | Aptel et al. | 424/456 |
| 5,051,304 A | | 9/1991 | David et al. | 428/402.2 |
| 5,059,622 A | | 10/1991 | Sears | 514/549 |
| 5,087,623 A | | 2/1992 | Boynton et al. | 514/188 |
| 5,087,624 A | | 2/1992 | Boynton et al. | 514/188 |
| 5,112,526 A * | | 5/1992 | Kuroda | 252/363.5 |
| 5,130,061 A | | 7/1992 | Cornieri et al. | 554/167 |
| 5,156,956 A | | 10/1992 | Motoki et al. | 435/68.1 |
| 5,175,156 A | | 12/1992 | Boynton et al. | 514/188 |
| 5,194,615 A | | 3/1993 | Jensen | 546/5 |
| 5,204,029 A | | 4/1993 | Morgan et al. | 264/4.4 |
| 5,330,778 A | | 7/1994 | Stark et al. | 426/531 |
| 5,356,636 A | | 10/1994 | Schneider et al. | 424/489 |
| 5,378,413 A | | 1/1995 | Mihm et al. | 264/4.3 |
| 5,413,804 A * | | 5/1995 | Rhodes | A23C 19/063 426/583 |
| 5,428,014 A | | 6/1995 | Labroo et al. | 514/12 |
| 5,456,985 A | | 10/1995 | Zgoulli et al. | 428/402.2 |
| 5,573,934 A | | 11/1996 | Hubbell et al. | 435/177 |
| 5,591,255 A * | | 1/1997 | Small et al. | 106/31.61 |
| 5,603,952 A | | 2/1997 | Soper | 424/456 |
| 5,603,961 A | | 2/1997 | Suzuki et al. | 424/502 |
| 5,670,029 A | | 9/1997 | Wyckoff | 427/215 |
| 5,700,397 A | | 12/1997 | Maeda et al. | 428/402.24 |
| 5,759,599 A | | 6/1998 | Wampler et al. | 426/89 |
| 5,766,637 A | | 6/1998 | Shine et al. | 424/497 |
| 5,780,056 A | | 7/1998 | Akamatsu et al. | 424/464 |
| 5,788,991 A | | 8/1998 | Nastke et al. | |
| 5,827,531 A | | 10/1998 | Morrison et al. | 424/450 |
| 5,846,581 A | | 12/1998 | Catron | 426/74 |
| 5,872,140 A | | 2/1999 | Hesse et al. | 514/359 |
| 5,993,851 A | | 11/1999 | Foldvari | 424/450 |
| 5,997,863 A | | 12/1999 | Zimmermann | 424/94.5 |
| 6,019,988 A | | 2/2000 | Parab et al. | 424/400 |
| 6,019,998 A | | 2/2000 | Nomoto et al. | 424/400 |
| 6,020,200 A | | 2/2000 | Enevold | 435/382 |
| 6,039,901 A | | 3/2000 | Soper | 264/4.3 |
| 6,063,820 A | | 5/2000 | Cavazza | 514/739 |
| 6,066,344 A | | 5/2000 | Golightly et al. | 426/74 |
| 6,103,378 A | | 8/2000 | Yao et al. | 428/402.2 |
| 6,106,875 A | | 8/2000 | Soper et al. | |
| 6,221,401 B1 | | 4/2001 | Zasadzinski et al. | 424/490 |
| 6,234,464 B1 | | 5/2001 | Krumbholz et al. | 264/4.32 |
| 6,235,951 B1 | | 5/2001 | Sakyu et al. | 570/156 |
| 6,248,323 B1 | | 6/2001 | Arnold et al. | 424/93.51 |
| 6,274,174 B1 | | 8/2001 | Hom-ma et al. | 424/489 |
| 6,300,377 B1 | | 10/2001 | Chopra | 514/715 |
| 6,325,951 B1 | | 12/2001 | Soper et al. | 264/4.3 |
| 6,328,995 B1 | | 12/2001 | Bewert | 424/489 |
| 6,365,176 B1 | | 4/2002 | Bell et al. | 424/439 |
| 6,365,189 B1 * | | 4/2002 | Quong | 424/489 |
| 6,375,968 B1 * | | 4/2002 | Quong | 424/408 |
| 6,417,233 B1 | | 7/2002 | Sears et al. | 514/549 |
| 6,441,050 B1 | | 8/2002 | Chopra | 514/675 |
| 6,482,433 B1 | | 11/2002 | DeRoos et al. | 424/464 |
| 6,528,165 B2 | | 3/2003 | Chandler | 428/402.2 |
| 6,534,091 B1 | | 3/2003 | Garces et al. | 424/489 |
| 6,534,094 B2 | | 3/2003 | Moyano et al. | |
| 6,534,926 B1 | | 3/2003 | Miller et al. | 315/224 |
| 6,544,926 B1 | | 4/2003 | Bodmer et al. | 503/215 |
| 6,630,157 B1 | | 10/2003 | Horrobin et al. | 424/439 |
| 6,652,891 B2 | | 11/2003 | Selzer | 424/757 |
| 6,713,469 B2 | | 3/2004 | De la Harpe et al. | 514/188 |
| 6,793,937 B2 * | | 9/2004 | Quong | 424/489 |
| 6,809,115 B2 | | 10/2004 | Katz et al. | 514/505 |
| 6,881,752 B2 | | 4/2005 | Vincent et al. | 514/505 |
| 6,969,530 B1 | | 11/2005 | Curtis et al. | 424/489 |
| 6,972,592 B2 | | 12/2005 | Benware | 326/38 |
| 6,974,592 B2 | | 12/2005 | Yan | 424/489 |
| 7,727,629 B2 * | | 6/2010 | Yan | 428/402.2 |
| 7,727,692 B2 | | 6/2010 | Yan | |
| 2002/0031553 A1 | | 3/2002 | Moyano et al. | 424/491 |
| 2002/0164364 A1 * | | 11/2002 | Quong | 424/417 |
| 2003/0044380 A1 | | 3/2003 | Zhu et al. | 424/78.37 |
| 2003/0091654 A1 | | 5/2003 | Katz et al. | 424/655 |
| 2003/0133886 A1 | | 7/2003 | Smith et al. | 424/59 |
| 2004/0041251 A1 | | 3/2004 | Goller et al. | 257/690 |
| 2004/0106591 A1 | | 6/2004 | Pacioretti et al. | 514/184 |
| 2004/0213886 A1 | | 10/2004 | Toves | |
| 2005/0019416 A1 | | 1/2005 | Yan | 424/490 |
| 2005/0067726 A1 | | 3/2005 | Yan et al. | 264/4.1 |
| 2005/0227907 A1 * | | 10/2005 | Lee et al. | 512/4 |
| 2006/0165990 A1 * | | 7/2006 | Curtis et al. | 428/402.2 |
| 2007/0027028 A1 | | 2/2007 | Pears et al. | 568/902.2 |
| 2007/0059340 A1 | | 3/2007 | Bello et al. | 424/439 |
| 2007/0078071 A1 | | 4/2007 | Lee | 510/441 |
| 2007/0141211 A1 | | 6/2007 | Kolar et al. | 427/201 |
| 2007/0224216 A1 | | 9/2007 | Teas | |
| 2007/0269566 A1 * | | 11/2007 | Curtis et al. | 516/20 |
| 2008/0139649 A1 * | | 6/2008 | Barrow et al. | 514/546 |
| 2008/0206316 A1 * | | 8/2008 | Barrow et al. | 424/450 |
| 2009/0274791 A1 | | 11/2009 | Mattson | |
| 2010/0055281 A1 | | 3/2010 | Barrow | |
| 2010/0173002 A1 | | 7/2010 | Jin | |

FOREIGN PATENT DOCUMENTS

| | | |
|---|---|---|
| EP | 0301777 | 2/1989 |
| EP | 0 416 575 A | 3/1991 |
| EP | 0426428 B1 | 8/1993 |
| EP | 0434760 B1 | 1/1994 |
| EP | 0 782 883 A2 | 7/1997 |
| EP | 0 821 881 A2 | 2/1998 |
| EP | 0 897 970 A1 | 2/1999 |
| EP | 1116516 | 7/2001 |
| EP | 0 821 881 B1 | 9/2001 |
| EP | 0644771 B1 | 8/2002 |
| EP | 0 982 038 B1 | 1/2003 |
| EP | 0745670 B1 | 6/2004 |
| EP | 1357977 B1 | 7/2004 |
| EP | 1237423 B1 | 8/2004 |
| EP | 0 897 970 B1 | 9/2004 |
| GB | 1198412 | 7/1970 |
| GB | 2 091 286 | 7/1982 |
| GB | 2115768 | 9/1983 |
| JP | 58-28234 | 2/1983 |
| JP | 5-8149645 | 9/1983 |
| JP | 01148338 | 6/1989 |
| JP | 5-292899 | 11/1993 |
| WO | WO91/06287 | 5/1991 |

(56) References Cited

FOREIGN PATENT DOCUMENTS

| WO | WO 92/11083 | * | 7/1992 |
|----|----|----|----|
| WO | WO 92/011083 | | 7/1992 |
| WO | WO 93/19622 | * | 10/1993 |
| WO | WO 97/013416 | | 4/1997 |
| WO | WO97/13416 | | 4/1997 |
| WO | WO97/40701 | | 11/1997 |
| WO | WO 2001/80656 | | 11/2001 |
| WO | WO 2002/096408 | | 12/2002 |
| WO | WO 2003/105606 | | 12/2003 |
| WO | WO 2003/106014 | | 12/2003 |
| WO | WO 04/041251 | | 5/2004 |

OTHER PUBLICATIONS

Shahidi et al., "Encapsulation of Food Ingredients", Critical Reviews in Food Science and Nutrition, 33(6):501-547 (1993).*
Barrow et al., "Stablization of highly unsaturated fatty acids and delivery into foods," Lipid Technology, 9(5):108-111 (2007).
European Search Report for 06020381.7 dated Apr. 10, 2007.
Fong, "Microencapsulation by solvent and organic phase separation processes," In "Controlled Release Systems: Fabrication Technology," Hsieh Ed., CRC Press, New York, pp. 99-105, 1988.
Goyer, Toxic effects of metals. In: Casarett and Doull's Toxicology. Amdur et al., Eds., $4^{th}$ ed., Pergamon Press, New York, pp. 638-639, 1991.
Kas and Oner, "Microencapsulation using coacervation/phase separation," In Handbook of Pharmaceutical Controlled Release Technology, Wise Ed., Marcel Dekker Inc., New York, pp. 301-328, 2000.
Sparks, "Microencapsulation," In "Kirk-Othmer, Encyclopedia of Chemical Technology," vo. 15, $3^{rd}$ Ed., John Wiley & Sons Inc., New York, pp. 470-793, 1981.
Soper, "Utilization of coacervated flavors," In "Encapsulation and Controlled Release of Food Ingredients," Risch and Reineccius Ed., ACS Symposium Series 590, Washington DC, pp. 104-112, 1995.
Whorton and Reineccius, "Evaluation of the mechanisms associated with the release of encapsulated flavor material form maltodextrin matrices," In "Encapsulation and Controlled Release of Food Ingredients," Risch and Reineccius Ed., ACS Symposium Series 590, Washington DC, 143-160, 1995.
Appel et al., "Does supplementation of diet with 'fish oil' reduce blood pressure? A meta-analysis of controlled clinical trials," Arch Intern Med, 153(12):1429-1438, 1993.
Beestman, "Microencapsulation of solid particles," Chemical Abstract, Abstracts of Papers, 220th ACS National Meeting, Washington, DC, United States, Aug. 20-24, 2000, AGRO-037. CODEN: 69FZC3 AN 2000:793223.
Borghi, "Omega-3 LC PUFAs, A new solution for pasteurized milk enrichment," Wellness Foods Europe, pp. 25-26, May 2005.
Calon et al., "Docosahexaenoic acid protects from dentritic pathology in an Alzheimer's Disease mouse model," Neuron, 43:633-45, 2004.
Choi and Regenstein, "Physicochemical and sensory characteristics of fish gelatin," J Food Sci: Food Chemistry and Toxicology, 65:194-199, 2000.
Dyrberg et al., "In: Omega-3 fatty acids: prevention and treatment of vascular disease," Kristensen et al., Eds., Bi & Gi Publ., Verona-Springer-Verlag, London, pp. 217-226, 1995.
Evans et al., "Interaction of the glucose tolerance factor (GTF) with insulin," Biochem Biophys Res Commun, 50(3):718-22, 1973.
GISSI—Prevenzione Investigators, "Dietary supplementation with omega-3 polyunsaturated fatty acids and vitamin E after myocardial infarction: results of the GISSI—Prevenzione trial," Lancet, 354:447-55, 1999.
Harris, "Extending the cardiovascular benefits of omega-3 fatty acids," Curr Atheroscler Rep, 7:375-80, 2005.
Haug et al., Physical and rheological properties of fish gelatin compared to mammalian gelatin, Food Hydrocolloids, 18:203-213, 2004.

Holub, "Clinical Nutrition: 4 Omega-3 fatty acids in cardiovascular care," CMAJ, 166(5):608-15, 2002.
Ijichi et al., "Multi-layered gelatin/acacia microcapsules by complex coacervation method," J Chem Eng Jpn, 30(5):793-98, 1997.
Janis et al., "Preparation of 1-monoglycerols from glycidol and fatty acids catalyzed by the chromium (III)-fatty acid system," Eur J Lipid Sci Technol, 351-354, 2000.
Kage et al., "Microencapsulation of mono-dispersed droplets by complex coacervation and membrane thickness of generated capsules," Chemical Abstract No. Accession 615273, 2000.
Kris-Etherton et al., "Fish consumption, fish oil, Omega-3 fatty acids and cardiovascular disease," The American Heart Association Scientific Statement, 106(21):2747-57, Nov. 2002.
Marcus and Coulston, "The Vitamins," In: Gilman et al., eds., Goodman and Gilman's the pharmacological basis of therapeutics, McGraw-Hill, Inc., New York, pp. 1524-1529, $1990^{V}$.
Mori et al., "Purified eicosapentaenoic and docosapentaenoic acids have differential effects on serum lipids and lipoproteins, LDL particle size, glucose, and insulin in mildly hypelipidemic men," Am J Clin Nutr, 71:1085-94, 2000.
Muskiet et al., "Is docosahexaenoic acid (DHA) essential? Lessons from DHA status regulation, our ancient diet, epidemiology and randomized controlled trials," J Nutr, 134(1):183-6, 2004.
O'Keefe and Harris, "Omega-3 fatty acids: Time for clinical implementation?" Am J Cardiology, 85:1239-41, 2000.
Ovide-Bordeaux and Grynberg, "Docosahexaenoic acid affects insulin-deficiency and inulin resistance-induced alterations in cardiac mitochondria," Am J Physiol Regul Integr Comp Physiol, 286:R519-27, 2003.
Radack et al., "The effects of low doses of omega-3 fatty acid supplementation on blood pressure in hypertensive subjects: a randomized controlled trial," Arch Intern Med, 151:1173-80, 1991.
Recommended Dietary Allowances, Ninth Revised Edition, The National Academy of Sciences, $9^{th}$ Revised Edition, p. 159-160, 1980.
Sugano and Michihiro, "Balanced intake of polyunsaturated fatty acids for health benefits," J Oleo Sci, 50(5):305-11, 2001.
Thimma et al., "Study of complex coacervation of gelatin with sodium carboxymethyl guar gum: Microencapsulation of close oil and sulphamethoxazole," J Microencapsulation, 20(2):203-210, 2003.
Wang et al., "Serum cholesterol of adults supplemented with brewer's yeast or chromium chloride," Nutr Res, 9:989-998, 1989.
Webb, "Alternative sources of omega-3 fatty acids," Natural Foods Merchandiser, XXVI(8):40-44, 2005.
Yoshida et al., "Manufacture of microcapsules from complex coacervation processes," Chemical Abstract, Accession No. 140735, 1990 (Abs).
European Search Authority, International Search Report for PCT/IB2006/001214 dated Feb. 8, 2007.
European Search Authority, International Written Opinion for PCT/IB2006/001214 dated Feb. 8, 2007.
Kondo et al., "Microencapsulation utilizing phase separation from an aqueous solution system," Microcapsule Processing and Technology, Marcel Dekker Inc., New York, (1979) , pp. 70-94.
Leclercq et al., "Formation and characterization of microcapsules by complex coacervation with liquid or solid aroma cores," Flavour Fragr. J., 24:17-24 (2009).
Magdassi et al., "Microencapsulation of Oil-in-Water Emulsions by Proteins," Microencapsulation—Methods and Industrial Applications, edited by Simon Benita, Marcel Dekker, Inc., New York, pp. 21-33 (1996).
Ocean Nutrition Canada Limited, "Prototype Development of Dairy Beverages at Microthermics," pp. 1-14, Nova Scotia, Canada (Aug. 26, 2004).
Onuki et al., "In vivo effects of highly purified docosahexaenoic acid on rectal insulin absorption," Int. J. Pharm., 198:147-156 (Apr. 5, 2000).
Boh et al., "Microcapsule Applications: Patent and Literature Analysis," MML Series, 6:85-156 (2003).
International Search Report and Written Opinion for PCT/US08/000301 dated Apr. 30, 2008.

(56) References Cited

OTHER PUBLICATIONS

International Search Report and Written Opinion for PCT/US07/008138 dated May 9, 2008.
International Search Report and Written Opinion for PCT/IB07/03358 dated Apr. 25, 2008.
International Search Report and Written Opinion for PCT/IB06/01526 dated Aug. 22, 2006.
Masao et al., "Cosmetic," abstract of JP61172807, dated Aug. 4, 1986, Japanese Patent Office.
Takehior et al., "Production of gelatin having high polymerization degree, " abstract of JP2086743, dated Mar. 27, 1990, Japanese Patent Office.
Office Action for Application No. CA 2614348 dated Feb. 11, 2013.
Office Action for Application No. CA 2614348 dated Nov. 25, 2013.
Office Action for Application No. CA 2614348 dated Aug. 7, 2014.
Response to Office Action for Application No. CA 2614348 dated Aug. 8, 2013.
Response to Office Action for Application No. CA 2614348 dated May 26, 2014.
Encyclopedia of Pharmaceutical Technology, "Micoencapsulation," Editors; James Swarbrick and James C. Boylan, Marcel Dekker, Inc., New York, vol. 9, pp. 423-441, Nov. 9, 1993.
Opposition against EP1492417 dated Aug. 14, 2007.
Response to Opposition against EP1492417 dated Apr. 21, 2008.
Response from the Opponent to submission of proprietor against EP1492417 dated Nov. 18, 2008.
Letter regarding Opposition procedure from European Patent Office against EP1492417 dated Apr. 6, 2009.
Withdrawal of Opposition against EP1492417 dated Jul. 14, 2010.
Opposition against EP1492417 dated Feb. 10, 2011.
Written submission in preparation to/during oral proceedings against EP1492417 dated Oct. 5, 2012.
Grounds for decision revoking EP1492417 dated Feb. 1, 2013.
Statement of grounds of Appeal for EP1492417 dated Jun. 10, 2013.
Reply to Appeal for EP1492417 dated Oct. 25, 2013.
Office Action, dated Oct. 15, 2015, received in connection with U.S. Appl. No. 14/198,079.
Office Action issued in related Chinese Application No. 201410710886.9, dated Jul. 22, 2016.
Cheng, et al., Contemporary Novel Food 1998, p. 487 and p. 699.
Office Action, dated Mar. 5, 2015, received in connection with U.S. Appl. No. 14/198,079.

\* cited by examiner

HOMOGENIZED FORMULATIONS CONTAINING MICROCAPSULES AND METHODS OF MAKING AND USING THEREOF

BACKGROUND

Homogenization is a fluid mechanical treatment that involves the subdivision of particles or droplets into uniform sizes to create a stable dispersion or emulsion for further processing. Perhaps most associated with the dairy industry, homogenization involves forcing milk, an oil-in-water emulsion, under high pressure through a tiny orifice, thereby decreasing the average diameter and increasing the number and surface area of the fat globules in the milk. The net result is a much reduced tendency for creaming of the fat globules. Further, homogenized milk has better taste, an improved shelf life, and a reduced number of preservatives are usually needed.

Homogenization of fluids other than milk is also common. For example, food and feed products are often homogenized before spray drying to ensure the best quality powders are produced. This can be particular important for baby foods, as well as other easily masticatable food products. Homogenization is also essential to the quality and stability of many cosmetics, perfumes, beauty creams, lotions, nail varnishes, soaps, shampoos, and toothpastes. The pharmaceutical industry also makes wide use of homogenization to formulate APIs (Active Pharmaceutical Ingredients) into ointments, emulsions, syrups, liquids, and controlled release preparations.

Pressure-based homogenization techniques are quite common and are typically used in the dairy and food industries. Such techniques involve a special device that contains a homogenizing valve. As fluid is forced under high pressures through a minute gap in the homogenizing valve, conditions of high turbulence, pressure, cavitation, and shear are created. These conditions cause the disintegration of the particles or droplets throughout the fluid. Oftentimes, the product is then pass through a second valve similar to the first, which further separates any remaining clumps or clusters of the particles or droplets. After homogenization, the particles or droplets are usually of reduced and uniform size (e.g., 0.1 to 5 µm, depending on the particular operating procedures).

Whether one uses pressure-based homogenizing techniques or some other homogenizing technique (e.g., sonication-based techniques and mechanical-based techniques), three main factors contribute to the enhanced properties of a homogenized fluid such as milk: a decrease in the mean diameter of the particles or droplets in the fluid, a decrease in the size distribution of the particles or droplets (causing the speed of rise to be similar for the majority of particles or droplets such that they don't tend to cluster during creaming), and an increase in density of the particles or droplets (bringing them closer to the continuous phase).

Many products that are homogenized during preparation are also desirable compositions in which to incorporate microencapsulated materials. For example, dairy products could be fortified with microcapsules containing various nutritional supplements. Lotions, creams, and other cosmetics could be formulated to include microencapsulated materials such as pigments, conditioners, moisturizers, UV-blocking agents, etc. Pharmaceutical preparations are also possible recipients for microencapsulated products. While these and other products could be valuable and beneficial products, homogenizing conditions are typically too harsh for microencapsulated materials. As such, adding microcapsules to various products is not done, or is done only after homogenization. And adding microcapsules after homogenization can be undesirable. For example, plant processes may have to be redesigned in order to add microcapsules after homogenization. This can be particularly costly when the final product is sterilized or pasteurized.

In light of the desire for homogenized formulations that contain microcapsules, what are needed are methods for preparing such formulations, as well as formulations prepared by such methods. The subject matter disclosed herein meets these and other needs.

SUMMARY

In accordance with the purposes of the disclosed materials, compounds, compositions, articles, and methods, as embodied and broadly described herein, the disclosed subject matter, in one aspect, relates to formulations and methods for preparing and using such formulations. In a further aspect, the disclosed subject matter relates to homogenized formulations that comprise microcapsules. In a still further aspect, the disclosed subject matter relates to methods of making and using the disclosed homogenized formulations.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects described below.

DETAILED DESCRIPTION

Figure 1:
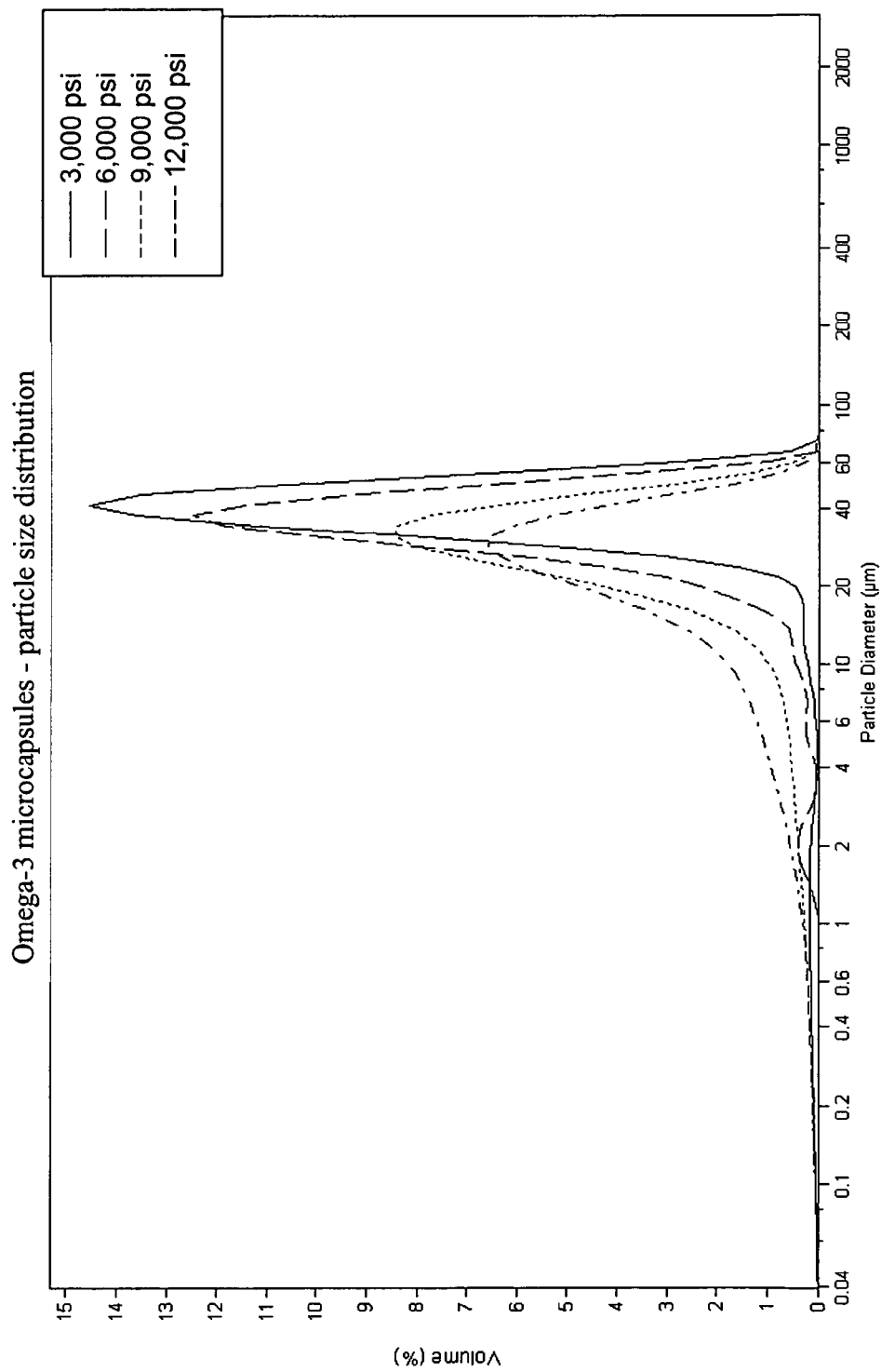
FIG. 1 is a graph of particle size distribution for microcapsules homogenized at 3000, 6000, 9000, or 12,000 psi.

The materials, compounds, compositions, and methods described herein may be understood more readily by reference to the following detailed description of specific aspects of the disclosed subject matter and the Examples included therein and to the Figures.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a compound" includes mixtures of two or more such compounds, reference to "an acid" includes mixtures of two or more such acids, reference to "the formulation" includes mixtures of two or more such formulations, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that these data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular component in a composition denotes the weight relationship between the component and any other components in the composition for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

"Subject," as used herein, means an individual. In one aspect, the subject is a mammal such as a primate, and, in another aspect, the subject is a human. The term "subject" also includes domesticated animals (e.g., cats, dogs, etc.), livestock (e.g., cattle, horses, pigs, sheep, goats, etc.), and laboratory animals (e.g., mouse, rabbit, rat, guinea pig, fruit fly, etc.).

"Homogenization," as used herein, refers to any process for altering particle or droplet size (e.g., reducing size and/or creating size uniformity) in a fluid under conditions of pressure, shear, and/or stress. The term "homogenization" is intended to include the many and varied homogenization processes that involve the use of ultrasonic, pressure, and/or mechanical forces to homogenize a fluid. Examples of such homogenization techniques include, but are not limited to, multi-stage homogenization, high-pressure homogenization (also known as micronization), very high pressure homogenization (VPH), rotator-stator homogenization, blade homogenization, high shear mixers, sonication, high shear impellers, and the like.

Reference will now be made in detail to specific aspects of the disclosed materials, compounds, compositions, articles, and methods, examples of which are illustrated in the accompanying Examples.

Disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a compound is disclosed and a number of modifications that can be made to a number of components or residues of the compound are discussed, each and every combination and permutation that are possible are specifically contemplated unless specifically indicated to the contrary. Thus, if a class of components A, B, and C are disclosed as well as a class of components D, E, and F and an example of a combination composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Disclosed herein are methods for preparing a homogenized formulation that comprises providing a pre-homogenized composition comprising one or more microcapsules and homogenizing the composition. In these methods, the microcapsules are present in the pre-homogenized composition prior to homogenization. Thus, when the pre-homogenized composition undergoes homogenization, as disclosed herein, the microcapsules are present during and subjected to the homogenization process. Further, in many examples disclosed herein the homogenized formulations are further processed (e.g., pasteurized/sterilized). Thus, the disclosed homogenized formulations can also be pasteurized or sterilized formulations.

In the disclosed formulations, the amount of microcapsules in a homogenized formulation can be at least 50% of the amount of microcapsules in a pre-homogenized composition. In other examples, the amount of microcapsules in a homogenized formulation can be at least about 55, 60, 65, 70, 75, 80, 85, 90, 95, 97, 98, or 99% of the amount of microcapsules in a pre-homogenized composition, where any of the stated values can form an upper or lower endpoint of a range. The amount of microcapsules in the disclosed homogenized formulations and pre-homogenized compositions can be determined by methods known in the art (for example, see the Examples disclosed herein).

The disclosed homogenized formulations and methods have certain advantages over many existing compositions. For example, by having microcapsules present in the "crude" starting material (i.e., prior to homogenization and, in some cases, prior to other processing techniques such as pasteurization or sterilization), a plant's existing processing streams can be used, thus avoiding costly modifications to most existing designs where pasteurization is performed directly before or after homogenization. Another advantage is that the microcapsules are subjected to the homogenization process (and, in other examples, pasteurization and sterilization processes as well). This can avoid regulatory issues that surround methods where microcapsules (or other additives) are added after pasteurization/sterilization, which usually require that the product be re-pasteurized or re-sterilized.

Further advantages of certain homogenized formulations (e.g., dairy formulations) and methods disclosed herein can include a narrower particle size distribution of the microcapsules in the homogenized formulations as compared to formulations where the microcapsules were added after homogenization and thus not homogenized. Also, when the homogenized formulations are pasteurized, as is typically done for dairy products, milk proteins can assemble around the outer shell of the microcapsule during pasteurization. The degree and amount of assembly is believed to be dependent on the time and temperature of pasteurization. The assembly of the milk proteins (e.g., whey proteins and caesins) can improve the flavor of the formulation, since such proteins are known to be good adsorbers of certain flavors and odors. Also, the associated milk proteins can provide further stability to the microcapsules and their contents.

In the disclosed methods, the pre-homogenized composition can be any fluid that is to be homogenized. Thus, the disclosed methods are not intended to be limited in any way by the particular pre-homogenized compositions. For example, the pre-homogenized composition can be any comestible, cosmetic, pharmaceutical, nutritional, or health care product that is to be homogenized. In certain specific examples, the pre-homogenized composition can be a dairy product (e.g., milk).

It is understood that suitable pre-homogenized compositions can have already been homogenized one or more times before. As long as these compositions are to be homogenized at least once again, they are acceptable pre-homogenized compositions for the disclosed methods.

The pre-homogenized can also be either pasteurized or un-pasteurized. For example, a dairy composition that is pasteurized, but has yet to be homogenized, is a suitable pre-homogenized composition. Also, a dairy composition that has yet to be either homogenized or pasteurized (in any order) is a suitable pre-homogenized composition.

The disclosed pre-homogenized compositions, as well as the resulting homogenized formulations provided therefrom, can comprise one or more microcapsules. In some examples the disclosed pre-homogenized compositions and resulting homogenized formulations can comprise the same type of microcapsules and, in other examples, different types of microcapsules (e.g., microcapsules containing different loading substances).

Suitable microcapsules for use in the disclosed formulations and methods can be any microcapsule as disclosed herein. For example, the microcapsules can comprise an agglomeration of primary microcapsules and a loading substance. Each individual primary microcapsule has a primary shell. The loading substance is encapsulated by the primary shell and the agglomeration is encapsulated by an outer shell. Particularly suitable microcapsules are disclosed in U.S. Pat. Nos. 6,974,592 and 6,969,530 and US Publication No. 2005-0019416-A1, which are all incorporated by reference herein in their entireties for at least their disclosures of microcapsules, their methods of preparation, and their methods of use.

The microcapsules disclosed herein generally have a combination of high payload and structural strength. For example, the disclosed microcapsules are strong enough to survive the homogenization process. Further, the payloads of loading substances in the disclosed microcapsules can be from about 20% to about 90%, about 50% to about 70% by weight, or about 60% by weight of the microcapsules. In other examples, the disclosed microcapsules can contain about 20, 25, 30, 35, 40, 45, 50, 55, 60, 65, 70, 75, 80, 85, or 90% by weight of the microcapsule, where any of the stated values can form an upper or lower endpoint when appropriate.

It is also contemplated that one or more additional shell layers can be placed on the outer shell of the microcapsules. The techniques described in International Publication No. WO 2004/041251 A1, which is incorporated by reference in its entirety, can be used to add additional shell layers to the microcapsules.

In the disclosed microcapsules, the primary shell and/or outer shell material can comprise a surfactant, gelatin, polyphosphate, polysaccharide, or mixtures thereof. Further examples of suitable materials for the primary shell and/or outer shell include, but are not limited to, gelatin type A, gelatin type B, polyphosphate, gum arabic, alginate, chitosan, carrageenan, pectin, starch, modified starch, alfa-lactalbumin, beta-lactoglobumin, ovalbumin, polysorbiton, maltodextrin, cyclodextrin, cellulose, methyl cellulose, ethyl cellulose, hydropropylmethylcellulose, carboxymethylcellulose, milk protein, whey protein, soy protein, canola protein, albumin, kosher gelatin, non-kosher gelatin, Halal gelatin, and non-Halal gelatin, including combinations and mixtures thereof. One specific type of primary shell and/or outer shell material that can be used in the disclosed microcapsules is fish gelatin or pork gelatin.

In many examples disclosed herein, the primary shell and/or outer shell material can have a Bloom number of from about 0 to about 300. The Bloom number describes the gel strength formed at 10° C. with a 6.67% solution gelled for 18 hours. Determining the Bloom number of a substance can be accomplished by methods known in the art. In some specific examples the first polymer component can have a Bloom number of from about 0 to about 50, and in other examples the first polymer component can have a Bloom number of from about 51 to about 300. Still other specific examples include microcapsules comprising a primary shell and/or outer shell material having a Bloom number of about 0, about 210, about 220, or about 240. It is contemplated that the primary shell and/or outer shell material can have a Bloom number of about 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300, where any of the stated values can form an upper or lower endpoint when appropriate.

In many of the disclosed microcapsules the primary shell and/or outer shell can comprise a complex coacervate. For example, the primary shell and/or outer shell can comprise a complex coacervate of gelatin and polyphosphate.

In the disclosed microcapsules the outer shell can have an average diameter of from about 1 µm to about 2,000 µm, from about 20 µm to about 1,000 µm, or from about 30 µm to about 80 µm. In further examples, the average diameter of the outer shell can be about 1, 10, 20, 30, 40, 50, 60, 70, 80, 90, 200, 300, 400, 500, 600, 700, 800, 900, 1000, 1200, 1300, 1400, 1500, 1600, 1700, 1800, 1900, or 2000 µm, where any of the stated values can form an upper or lower endpoint when appropriate.

The primary shells of the disclosed microcapsules can have an average diameter of from about 40 nm to about 10 µm or from about 0.1 µm to about 5 µm. In further examples, the average diameter of the primary shell can be about 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1000 nm, 2 µm, 3 µm, 4 µm, 5 µm, 6 µm, 7 µm, 8 µm, 9 µm, 10 µm, where any of the stated values can form an upper or lower endpoint when appropriate.

Particle size can be measured using any typical equipment known in the art, for example, a Coulter LS230 Particle Size Analyzer, Miami, Fla., USA.

In the disclosed microcapsules, the loading substance can be any substance that one desires to be present in the disclosed pre-homogenized compositions and homogenized formulations, and that is not entirely soluble in an aqueous mixture. The loading substance can be a solid, a hydrophobic liquid, or a mixture of a solid and a hydrophobic liquid. In many of the examples herein, the loading substance can comprise a long chain polyunsaturated fatty acid, specific examples of which are included below. Further, the loading substance can comprise a biologically active substance, a nutritional supplement, and/or a flavoring substance, including mixtures and combinations thereof. In other examples, the loading substance can comprise microbial oil, algal oil (e.g., oil from a dinoflagellate such as *Crypthecodinium cohnii*), fungal oil (e.g., oil from *Thraustochytrium, Schizochytrium*, or a mixture thereof), and/or plant oil, including mixtures and combinations thereof.

In still other examples, a suitable loading substance can comprise marine oil, such as natural and refined and concentrated fish oil. Examples of suitable fish oils include, but are not limited to, Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, and shark oil, including mixtures and combinations thereof. Non-alkaline treated fish oil is also a suitable loading substance. Other marine oils suitable for use herein include, but are not limited to, squid oil, cuttle fish oil, octopus oil, krill oil, seal oil, whale oil, and the like, including mixtures and combinations thereof. Any marine oil and combination of marine oil can be used in the disclosed compositions and in the disclosed methods to prepare them.

Many of the microbial, algal, fungal, plant, and marine oils disclosed herein contain omega-3 fatty acids. As such, certain microcapsules disclosed herein can contain a loading substance that comprises an omega-3 fatty acid, an alkyl ester of an omega-3 fatty acid, a triglyceride ester of an omega-3 fatty acid, a phytosterol ester of an omega-3 fatty acid, and/or mixtures and combinations thereof.

An omega-3 fatty acid is an unsaturated fatty acid that contains as its terminus $CH_3$—$CH_2$—$CH$=$CH$—. Generally, an omega-3 fatty acid has the following formula:

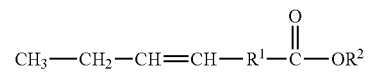

wherein $R^1$ is a $C_3$-$C_{40}$ alkyl or alkenyl group comprising at least one double bond and $R^2$ is H or alkyl group. The term "alkane" or "alkyl" as used herein is a saturated hydrocarbon group (e.g., methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like). The term "alkene" or "alkenyl" as used herein is a hydrocarbon group containing at least one carbon-carbon double bond. Asymmetric structures such as (AB)C=C(CD) are intended to include both the E and Z isomers (cis and trans). In a further example, $R^1$ can be a $C_5$-$C_{38}$, $C_6$-$C_{36}$, $C_8$-$C_{34}$, $C_{10}$-$C_{32}$, $C_{12}$-$C_{30}$, $C_{14}$-$C_{28}$, $C_{16}$-$C_{26}$, or $C_{18}$-$C_{24}$ alkenyl group. In yet another example, the alkenyl group of $R^1$ can have from 2 to 6, from 3 to 6, from 4 to 6, or from 5 to 6 double bonds. Still further, the alkenyl group of $R^1$ can have from 1, 2, 3, 4, 5, or 6 double bonds, where any of the stated values can form an upper or lower endpoint as appropriate.

Specific examples of omega-3 fatty acids that are suitable loading substances include, but are not limited to, linolenic acid (18:3ω3), octadecatetraenoic acid (18:4ω3), eicosapentaenoic acid (20:5ω3) (EPA), eicosatetraenoic acid (20:4ω3), henicosapentaenoic acid (21:5ω3), docosahexaenoic acid (22:6ω3) (DHA), docosapentaenoic acid (22:5ω3) (DPA), including derivatives and mixtures thereof. In other specific examples the loading substance can comprise docosahexaenoic acid and/or eicosapentaenoic acid, a $C_1$-$C_6$ alkyl ester thereof, a triglyceride ester thereof, a phytosterol ester thereof, and/or a mixture thereof.

Other examples of suitable loading substances that can be present in the disclosed microcapsules comprise at least 4, at least 6, at least 8, at least 10, at least 12, at least 14, at least 16, at least 18, or at least 20 carbon atoms. In some other examples, the loading substance can contain about 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 carbon atoms, where any of the stated values can form an upper or lower endpoint when appropriate. In still other examples, the loading substance can comprise a mixture of fatty acids (including derivatives thereof) having a range of carbon atoms. For example, the loading substance can comprise from about 8 to about 40, from about 10 to about 38, from about 12 to about 36, from about 14 to about 34, from about 16 to about 32, from about 18 to about 30, or from about 20 to about 28 carbon atoms.

Some further examples of loading substances are those that contain at least one unsaturated bond (i.e., a carbon-carbon double or triple bond). For example, the loading substance can contain at least 2, at least 3, at least 4, at least 5, at least 6, at least 7, or at least 8 carbon-carbon double bonds, triple bonds, or any combination thereof. In another example, the loading substance can comprise 1, 2, 3, 4, 5, 6, 7, or 8 unsaturated bonds, where any of the stated values can form an upper or lower endpoint as appropriate.

Some specific examples of loading substances, which are unsaturated fatty acids, are shown in the following tables. Derivatives of these fatty acids are also suitable and are thus contemplated herein.

TABLE 1

Examples of Monoene Acids

| Total number of carbon atoms in the fatty acid chain | Carbon number where double bond begins, ("c" denotes a cis double bond; "t" denotes a trans double bond) |
|---|---|
| 10 | 4c |
| 12 | 4c |
| 14 | 4c and 9c |
| 16 | 3t, 4c, 5t, 6c, 6t, 9c (palmitooleic), and 11c |
| 18 | 3t, 5c, 5t, 6c (petroselinic), 6t, 9c (oleic), 10c, 11c (cis-vaccenic), 11t (vaccenic), and 13c |
| 20 | 5c, 9c (gadolenic), 11c, 13c, and 15c |
| 22 | 5c, 11c (cetoleic), 13c (erucic), and 15c |
| 24 | 15c (selacholeic, nervonic) |
| 26 | 9c, and 17c (ximenic) |
| 28 | 9c, 19c (lumequic) |
| 30 | 21c |

Unsaturated fatty acids that contain at least one pair of methylene interrupted unsaturated bonds are also suitable loading substances. By "methylene interrupted unsaturated bond" is meant that one carbon-carbon double or triple bond is separated from another carbon-carbon double or triple bond by at least one methylene group (i.e., $CH_2$). Specific examples of such loading substances include, but are not limited to, the n-1 family derived from 9, 12, 15-16:3; n-2 family derived from 9, 12, 15-17:3, 15:3, 17:3, 17:4, 20:4; n-3 family derived from 9, 12, 15-18:3, 15:2, 15:3, 15:4, 16:3, 16:4, 18:3 (α-linolenic), 18:4, 18:5, 20:2, 20:3, 20:4; 20:5 (EPA), 21:5, 22:3, 22:5 (DPA), 22:6 (DHA), 24:3, 24:4, 24:5, 24:6, 26:5, 26:6, 28:7, 30:5; n-4 family derived from 9, 12-16:2, 16:2, 16:3, 18:2, 18:3; n-5 family derived from 9, 12-17:2, 15:2, 17:2, 17:3, 19:2, 19:4, 20:3, 20:4 21:4, 21:5; n-6 family derived from 9, 12-18:2, 15:2, 16:2, 18:2 (linoleic acid), 18:3 (γ-linolenic acid); 20:2, 20:3, 20:4 (arachidonic acid), 22:2, 22:3, 22:4 (adrenic acid), 22:5, 24:2, 24:4, 25:2, 26:2, 30:4; n-7 family derived from 9-16:1, 15:2, 16:2, 17:2, 18:2, 19:2; n-8 family derived from 9-17:1, 15:2, 16:2, 17:2, 18:2, 19:2; n-9 family derived from 9-18:1, 17:2, 18:2, 20:2, 20:3, 22:3, 22:4; n-11 family 19:2, and the n-12 family 20:2. In one particular specific example, the loading substance can comprise arachidonic acid.

In the above paragraph (and throughout) the compounds are identified by referring first to the "n-x family," where x is the position in the fatty acid where the first double bond begins. The numbering scheme begins at the terminal end of the fatty acid, where, for example, the terminal $CH_3$ group is designated position 1. In this sense, the n-3 family would be an omega-3 fatty acid, as described above. The next number identifies the total number of carbon atoms in the fatty acid. The third number, which is after the colon, designates the total number of double bonds in the fatty acid. So, for example, in the n-1 family, 16:3, refers to a 16 carbon long fatty acid with 3 double bonds, each separated by a methylene, wherein the first double bond begins at position 1, i.e., the terminal end of the fatty acid. In another example, in the n-6 family, 18:3, refers to an 18 carbon long fatty acid with 3 methylene separated double bonds beginning at position 6, i.e., the sixth carbon from the terminal end of the fatty acid, and so forth.

Further examples of loading substances that contain at least one pair of methylene interrupted unsaturated bonds are shown in Table 2.

TABLE 2

Examples of Polyene Acids

| Total number of carbon atoms in the fatty acid chain | Carbon number where double bond begins, ("c" denotes a cis double bond; "t" denotes a trans double bond) |
|---|---|
| 18 | 5, 9 |
|  | 5, 11 |
|  | 2t, 9, 12 |
|  | 3t, 9, 12 |
|  | 5t, 9, 12 |
|  | 5, 9, 12 |
|  | 5, 11, 14 |
|  | 3t, 9, 12, 15 |
|  | 5, 9, 12, 15 |
| 20 | 5, 11 |
|  | 5, 13 |
|  | 7, 11 |
|  | 7, 13 |
|  | 5, 11, 14 |
|  | 7, 11, 14 |
|  | 5, 11, 14, 17 |
| 22 | 5, 11 |
|  | 5, 13 |
|  | 7, 13 |
|  | 7, 15 |
|  | 7, 17 |
|  | 9, 13 |
|  | 9, 15 |

Specific examples of suitable loading substances that contain conjugated unsaturated bonds include, but are not limited to, those in Table 3. By "conjugated unsaturated bond" is meant that at least one pair of carbon-carbon double and/or triple bonds are bonded together, without a methylene ($CH_2$) group between them (e.g., —CH═CH—CH═CH—).

TABLE 3

Examples of Conjugated Polyene Acids

| Total number of carbon atoms in the fatty acid chain. | Carbon number where double bond begins. ("c" denotes a cis double bond; "t" denotes a trans double bond) |
|---|---|
| 10 | 2t, 4t, 6c |
|  | 2c, 4t, 6t |
|  | 3t, 5t, 7c |
|  | 3c, 5t, 7t |
| 12 | 3, 5, 7, 9, 11 |
| 14 | 3, 5, 7, 9, 11 |
| 18 | 10t, 12t |

TABLE 3-continued

Examples of Conjugated Polyene Acids

| Total number of carbon atoms in the fatty acid chain. | Carbon number where double bond begins. ("c" denotes a cis double bond; "t" denotes a trans double bond) |
|---|---|
| | 8c, 10t, 12c (jacaric) |
| | 8t, 10t, 12c (calendic) |
| | 8t, 10t, 12t |
| | 9t, 11t, 13c (catalpic) |
| | 9c, 11t, 13t (α-eleostearic) |
| | 9c, 11t, 13c (punicic) |
| | 9t, 11t, 13t (β-eleostearic) |
| | 9c, 11t, 13t, 15c (α-parinaric) |
| | 9t, 11t, 13t, 15t (β-parinaric) |

In the above examples of suitable loading substances, derivatives of the disclosed loading substances can also be used. By "derivatives" is meant the ester of a fatty acid (e.g., methyl and ethyl esters), salts of the fatty acids (e.g., sodium and potassium salts), and triglycerides, diglycerides, and monoglycerides, sterol esters, antioxidant-oil conjugates (e.g., ascorbyl palmitate), and naturally derivatives such as furanoid fatty acid derivatives.

The loading substances disclosed herein can also be crude oils, semi-refined (also called alkaline refined), or refined oils from such sources disclosed herein. Still further, the disclosed compositions and methods can use oils comprising re-esterified triglycerides.

It is contemplated herein that one or more of the disclosed loading substances can be used. For example the disclosed microcapsules can contain two or more different loading substances. Further, the loading substance can be present in an amount of from about 1% to about 50% by weight of the microcapsule. In specific examples, the loading substance can be present in an amount of from about 1% to about 40%, from about 1% to about 30%, from about 1% to about 20%, from about 1% to about 15%, or from about 1% to about 10% by weight of the microcapsule.

The microcapsules disclosed herein can also contain an antioxidant. Suitable examples of antioxidants include, but are not limited to, a phenolic compound, a plant extract, or a sulphur-containing compound. In certain examples disclosed herein the antioxidant can be ascorbic acid or a salt thereof, e.g., sodium ascorbate. In other examples, the antioxidant can be citric acid or a salt thereof. In still other examples, the antioxidant can be vitamin E, $CoQ_{10}$, tocopherols, lipid soluble derivatives of more polar antioxidants such as ascobyl fatty acid esters (e.g., ascorbyl palmitate), plant extracts (e.g., rosemary, sage and oregano oils), algal extracts, and synthetic antioxidants (e.g., BHT, TBHQ, ethoxyquin, alkyl gallates, hydroquinones, tocotrienols).

The disclosed microcapsules can also contain other nutrient(s) such as vitamins other trace elements, minerals, and the like. Further, the microcapsules can comprise other components such as preservatives, antimicrobials, anti-oxidants, chelating agents, thickeners, flavorings, diluents, emulsifiers, dispersing aids, or binders.

The disclosed microcapsules can contain any of the shell materials and any of the loading substances disclosed herein. Some specific examples include, but are not limited to, microcapsules where the shell materials are complex coacervates, e.g., coacervates of gelatin and polyphosphate. The shell material can, in certain examples, comprise gelatin with a Bloom number of from about 0 to about 50. Loading substances that can be used can, in many instances, include marine oils (e.g., fish oils and algal oils). Loading substances that comprise omega-3 fatty acids such as EPA and DHA can also be desirable. Further, derivatives of omega-3 fatty acids, such as mono-, di-, and triglycerides, alkyl esters, sterol esters, antioxidant esters (e.g., ascorbyl and citryl esters), and furanoid esters, can also be suitable loading substances.

Some particularly suitable microcapsules include microcapsules containing fish oils. Examples of such fish oils include, but are not limited to, sardine, anchovy, bonito, and/or tuna oil. Fish oils can also be referred to herein by the approximate ratio of EPA and DHA, or derivatives thereof, found in the oil. For example, 18:12 oils generally comprise a ratio of EPA to DHA (or their triglyceride esters for example) of about 18:12. Likewise, 5:25 oils generally comprise a ratio of EPA to DHA of about 5:25. Any of these oils can be encapsulated in a complex coacervate comprising and fish or pork gelatin. Such microcapsules can be Generally Regarded as Safe (GRAS), kosher, and/or halal. Also, such microcapsules can have at least about 130 mg of DHA or at least about 150 mg of EPA and DHA per gram of powder. Further, antioxidants such as ascorbic acid, citric acid, and/or phosphoric acid (or salts thereof) can be present in such microcapsules.

Some specific examples of homogenized formulations disclosed herein comprise microcapsules having about 130 mg of DHA per gram of microcapsule (e.g., a microcapsule wherein the loading substance comprises a 5:25 oil derived from tuna and/or bonito) and the outer shell of the microcapsules comprises pork or fish gelatin. In another specific example, the homogenized formulations disclosed herein comprise a microcapsule having about 150 mg of DHA and EPA per gram of microcapsule (e.g., a microcapsule wherein the loading substance comprises a 18:12 oil derived from sardine and/or anchovy) and the outer shell of the microcapsules comprises pork or fish gelatin. Any of these formulations can be infant formula, milk, or yogurt formulations for example.

Suitable microcapsules can also be prepared by methods disclosed herein. In general, disclosed herein are processes for preparing microcapsules that comprise providing an emulsion comprising a first polymer component and a loading substance; adding a second polymer component to the emulsion; adjusting pH, temperature, concentration, mixing speed, or a combination thereof to form an aqueous mixture comprising a primary shell material, wherein the primary shell material comprises the first and second polymer components and surrounds the loading substance; cooling the aqueous mixture to a temperature above the gel point of the primary shell material until the primary shell material forms agglomerations; and further cooling the aqueous mixture to form an outer shell around the agglomeration.

In the disclosed methods for preparing microcapsules, the first polymer component and second polymer component can be the same as any of the primary and outer shell materials described herein. That is, the first and second polymer components can become the primary and/or outer shell materials in the disclosed methods for preparing microcapsules. Furthermore, any of the loading substances described herein can be used in these methods for preparing microcapsules.

In the processes for preparing microcapsules disclosed herein, providing an emulsion of the first polymer component and the loading substance can be accomplished by methods and apparatus known in the art, e.g., homogenization and high pressure/high shear pumps. For example, emulsification can take place by emulsifying at from about 1,000 to about 15,000 rpm. The emulsification step can be monitored by removing a sample of the mixture and analyzing it under such methods as microscopy, light scattering, turbidity, etc. Generally, emulsification can be performed until an average droplet size of less than about 1,000, 750, 500, 100, or 10 nm is obtained. Not wishing to be bound by theory but it is believed that by varying the emulsification speed it is possible to produce single or multicore microcapsules. For example, when lower emulsification speeds are used (e.g., 1,000 to 2,000 rpm), the droplets of the loading substance are large enough to form a single particle, which upon encapsulation, produces a single core microcapsule. Conversely, if high emulsification speeds are used (e.g., 5,000 to 15,000 rpm), the resultant droplets of loading substance are usually small (e.g., from 1 to 10 μm). These tiny droplets can have higher surface energy and can readily form agglomerations when pH and/or temperature is adjusted accordingly, which results in the formation of multicore microcapsules upon encapsulation.

The emulsification step can be performed at greater than room temperature, greater than 30, 40, 50, 60, 70, or 80° C., where any of the stated values can form an upper or lower endpoint when appropriate. Specific examples include emulsifying the mixture at from about 30° C. to about 60° C. or from about 40° C. to about 50° C.

It is further contemplated that antioxidants and/or surfactants, which are also described herein, can be added to the aqueous mixture. Such antioxidants and/or surfactants can be added before, during, and/or after the emulsion is provided.

In the disclosed methods, the pH, temperature, concentration, mixing speed, or a combination thereof can be adjusted to form an aqueous mixture comprising a primary shell material, wherein the primary shell material comprises the first and second polymer components and surrounds the loading substance. The pH adjustment depends on the type of shell material to be formed. For example, the pH may be adjusted to a value from 3.5 to 5.0, or from 4.0 to 5.0. If the pH of the mixture starts in the desired range, then little or no pH adjustment is required.

The initial temperature of the aqueous mixture can be from about 20° C. to about 60° C., or about 30° C. to about 50° C.

Mixing can be adjusted so that there is good mixing without breaking the microcapsules as they form. Particular mixing parameters depend on the type of equipment being used. Any of a variety of types of mixing equipment known in the art may be used. In one example, an axial flow impeller, such as Lightnin A310 or A510, can be used.

In many examples disclosed herein, the primary shell and the outer shell of the disclosed microcapsules can comprise a complex coacervate. The complex coacervate can be formed from the first and second polymer components. For example, the primary shell and the outer shell can comprise a complex coacervate between gelatin and polyphosphate. All combinations of first and second polymer components are contemplated herein for the complex coacervate and the primary and outer shell.

The aqueous mixture can then be cooled under controlled cooling rate and mixing parameters to permit agglomeration of the primary shells to form encapsulated agglomerations of primary shells. Not wishing to be bound by theory, the encapsulated agglomerations are discrete particles themselves. It is advantageous to control the formation of the encapsulated agglomerations at a temperature above the gel point of the shell material, and to let excess shell material form a thicker outer shell. It is also possible at this stage to add more polymer, where the polymer is the same or different as the shell material being used, in order to thicken the outer shell and/or produce microcapsules having primary and outer shells of different composition. The outer shell encapsulates the agglomeration of primary shells to form a rigid encapsulated agglomeration of microcapsules.

Cooling the aqueous mixture can be accomplished by methods known in the art (e.g., the use of a chiller). The rate of cooling can be about 1° C. per about 1 to about 100 minutes. For example, the rate of cooling can be about 1° C. per about 1, 5, 10, 15, 20, 25, 30, 35, 40, 45, 50, 55, 60, 65, 70, 75, 80, 85, 90, 95, or 100 minutes, where any of the stated values can form an upper or lower endpoint when appropriate. In specific examples the rate of cooling can be about 1° C./5 minutes. Cooling can take place until the mixture reaches a temperature of from about 5° C. to about 10° C., e.g., about 5° C.

Processing aids can be included in the shell material (e.g., primary and/or outer shells). Processing aids can be used for a variety of reasons. For example, they may be used to promote agglomeration of the primary microcapsules, stabilize the emulsion system, improve the properties of the outer shells, control microcapsule size, and/or to act as an antioxidant. In one aspect, the processing aid can be an emulsifier, a fatty acid, a lipid, a wax, a microbial cell (e.g., yeast cell lines), a clay, or an inorganic compound (e.g., calcium carbonate). Not wishing to be bound by theory, these processing aids can improve the barrier properties of the microcapsules. In one aspect, one or more antioxidants can be added to the shell material. Antioxidant properties are useful both during the process (e.g., during coacervation and/or spray drying) and in the microcapsules after they are formed (i.e., to extend shelf-life, etc). Preferably a small number of processing aids that perform a large number of functions can be used. In one aspect, the antioxidant can be a phenolic compound, a plant extract, or a sulphur-containing amino acid. In one aspect, ascorbic acid or citric acid (or a salt thereof such as sodium or potassium ascorbate or sodium or potassium citrate) can be used to promote agglomeration of the primary microcapsules, to control microcapsule size and to act as an antioxidant. The antioxidant can be used in an amount of about 100 ppm to about 12,000 ppm, or from about 1,000 ppm to about 5,000 ppm. Other processing aids such as, for example, metal chelators, can be used as well. For example, ethylene diamine tetraacetic acid can be used to bind metal ions, which can reduce the catalytic oxidation of the loading substance.

In the disclosed microcapsules, the shell material can also be cross-linked. Thus, the disclosed methods can further involve the addition of a cross-linker. The cross-linker can be added to further increase the rigidity of the microcapsules by cross-linking the shell material in both the outer and primary shells and to make the shells insoluble in both aqueous and oily media. In one example, the cross-linker is added after the outer shell of the microcapsule is produced. Any suitable cross-linker can be used and the choice of cross-linker can vary depending upon the selection of the first and second polymer component. In another example, the cross-linkers can be enzymatic cross-linkers (e.g. transglutaminase), aldehydes (e.g. formaldehyde or gluteraldehyde), tannic acid, alum or a mixture thereof. In another aspect, the cross-linker can be a plant extract or a phenolic. It is also contemplated that one or more loading substances (e.g., antioxidants) can be used with the cross-linker. When the microcapsules are to be used in a formulation that is to be delivered to an organism, the cross-linkers are preferably non-toxic or of sufficiently low toxicity. The amount of cross-linker used depends on the components selected and can be adjusted to provide more or less structural rigidity as desired. In one aspect, the amount of cross-linker that can be used is in the amount of about 0.1% to about 5.0%, about 0.5% to about 5.0%, about 1.0% to about 5.0%, about 2.0% to about 4.0%, or about 2.5%, by weight of the first polymer component. In general, one skilled in the art can routinely determine the desired amount in any given case by simple experimentation. The cross-linker can be added at any stage of the process, however it, can typically be added after the cooling step.

Further, the disclosed microcapsules can be washed with water and/or dried to provide a free-flowing powder. Thus, the disclosed methods of preparing microcapsules can comprise a drying step for the microcapsules. Drying can be accomplished by a number of methods known in the art such as, for example, freeze drying, drying with ethanol, or spray drying. In one aspect, spray drying can be used for drying the microcapsules. Spray drying techniques are disclosed in "Spray Drying Handbook", K. Masters, 5th edition, Longman Scientific Technical UK, 1991, the disclosure of which is hereby incorporated by reference.

The any of the disclosed microcapsules can be added to any of the disclosed pre-homogenized compositions. The particular method of addition will depend on the particular pre-homogenized composition, the particular microcapsules, the homogenized composition, including its end use and methods and apparatus of preparation, as well as preference. The disclosed methods are not intended to be limited by any particular method of adding microcapsules to the pre-homogenized composition. In some example, the microcapsules are manually added or poured into the pre-homogenized composition (or added to a homogenized composition that is to be homogenized again). In other example, the microcapsules or solutions thereof can be pumped into the pre-homogenized compositions or added via a hopper. Other suitable methods of adding the microcapsules into the pre-homogenized composition are known in the art. Further, mixing can be also be desired in order to fully incorporate the microcapsules into the pre-homogenized compositions. Such mixing can also be accomplished by methods known in the art such as, but not limited to, mechanical stirrers, magnetic stirrers, shakers, bubbling gas, sonication, vortexing, and the like.

The particular amount of microcapsules that can be present in the pre-homogenized compositions will depend on the preference and the particular end use of the homogenized formulations. For example, if one desires or requires a particular amount microcapsules in the homogenized formulations disclosed herein, then about the same amount can be present in or added to the pre-homogenized compositions. Specific examples of amounts of microcapsules in homogenized dairy formulations, for example, can be from about 0.005% to about 25%, from about 0.01% to about 20%, from about 0.05% to about 18%, from about 0.1% to about 16%, from about 1% to about 10%, by weight of the total composition. Other examples can include formulations containing from about 0.005 to about 5%, from about 0.01 to about 5%, or from about 0.1 to about 5% microcapsules by weight of the total composition. In still other examples, the disclosed homogenized formulations can contain about 0.005, 0.01, 0.05, 0.1, 0.5, 1, 2, 3, 4, 5, 6, 7, 8, 9, 10, 11, 12, 13, 14, 15, 16, 17, 18, 19, 20, 21, 22, 23, 24, or 25% by weight of the total composition, where any of the stated values can form an upper or lower endpoint when appropriate.

In the disclosed methods, the pre-homogenized compositions are homogenized. Any homogenization technique and apparatus known in the art can be used in the disclosed methods. Such homogenization techniques and apparatuses are commonly used in, for example, the food, dairy, pharmaceutical, cosmetic, and fragrance industries. Many suitable homogenizers are commercially available. Homogenization can involve the use of sonication, pressure, and/or mechanical devices to homogenize the fluid. For example, the homogenization can be a single stage homogenization, a multi-step or multi-stage homogenization (e.g., a two-stage homogenization), a high pressure homogenization (e.g., single or multi-stage high pressure homogenizations), a very-high pressure homogenization, a rotator-stator homogenization, a blade homogenization, and the like.

In some examples, the homogenization step can be a pressure-based homogenization technique operating at pressures of from about 200 to about 15,000 psi, from about 500 to about 12,000 psi, from about 1,000 to about 9,000 psi, or from about 3,000 to about 6,000 psi. In still other examples, the homogenization step can be performed at about 200, 500, 1000, 1500, 2000, 2500, 3000, 3500, 4000, 4500, 5000, 5500, 6000, 6500, 7000, 7500, 8000, 8500, 9000, 9500, 10000, 10500, 11000, 11500, or 12000, 12500, 13000, 13500, 14000, 14500, 15000, where any of the stated values can form an upper or lower endpoint. It is further contemplated that multiple passes of homogenization at any of these pressures can be used, including combinations thereof.

After homogenization, the disclosed homogenized formulations can undergo further processing. For example, the homogenized formulations can be sterilized or pasteurized. Examples of typically pasteurization conditions are high temperature short time pasteurization (HTST), ultra pasteurization (UP), and ultra high temperature (UHT) pasteurization. The homogenized formulations can also be further processed after homogenization by, e.g., the addition of additives, further formulation into the final product, packaged, spray dried, etc. In some examples, the homogenized formulations can be steam injected. Steam injection is a known technique that is sometimes used in the dairy industry. Generally, steam is injected into the milk to remove odors produced when the moisture is flashed off during pasteurization. This process is typically used on milks that are UHT pasteurized.

It is also contemplated that the pre-homogenized compositions comprising one or more microcapsules can be processed prior to homogenization. For example, such pre-homogenized compositions comprising one or more microcapsules can first be sterilized or pasteurized and then homogenized. Likewise, the pre-homogenized compositions comprising one or more microcapsules can be subject to other processing steps prior to homogenization (e.g., the addition of additives, etc.).

The disclosed homogenized formulations have many and varied uses. Any current use of a homogenized fluid can also be suitable for the disclosed homogenized formulations. For comestible formulations, the homogenized formulations disclosed herein can generally be taken orally and can be in any form suitable for oral administration. For example, the homogenized formulation can be spray dried and then formed into a tablet or provided in a sachet. Alternatively, the homogenized formulations can be incorporated into gel-caps, capsules, liquids, syrups, ointments, lotions, creams, gels, or drops.

The homogenized formulations can also be designed for humans or animals, based on the recommended dietary intake for a given individual. Such considerations are generally based on various factors such as species, age, and sex as described above, which are known or can be determined by one of skill in the art. In one example, the disclosed formulations can be used as a component of feed for animals such as, but not limited to, livestock (e.g., pigs, chickens, cows, goats, horses, and the like), and domestic pets (e.g., cats, dogs, birds, and the like).

The disclosed homogenized formulations can also include additional carriers, as well as flavorings, thickeners, diluents, buffers, preservatives, surface active agents, emulsifiers, dispersing aids, or binders and the like in addition to the microcapsules disclosed herein.

Also disclosed herein are foodstuffs that comprise any of the disclosed homogenized formulations. By "foodstuff" is meant any article that can be consumed (e.g., eaten, drank, or ingested) by a subject. In one example, the disclosed homogenized formulations can be added to food or beverages. In this sense, the homogenized formulations (e.g., homogenized milk formulations) can be used to prepare foodstuffs such as a frozen dairy product (e.g., ice cream, yogurt), a milk product (e.g., flavored or enriched, dehydrated milk), or a cheese product.

Other examples of homogenized formulations or products derived therefrom than can be prepared by the methods disclosed herein include fresh/pasteurized milk, full fat fresh/pasteurized milk, semi skimmed fresh/pasteurized milk, long-life/UHT milk, full fat long life/UHT milk, semi skimmed long life/UHT milk, fat-free long life/UHT milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, cream, cheese, processed cheese, spreadable processed cheese, unspreadable processed cheese, unprocessed cheese, spreadable unprocessed cheese, hard cheese, packaged hard cheese, unpackaged hard cheese, yogurt, plain/natural yogurt, flavored yogurt, fruited yogurt, probiotic yogurt, drinking yogurt, regular drinking yogurt, probiotic drinking yogurt, chilled snacks, fromage frais and quark, plain fromage frais and quark, flavored fromage frais and quark, and kifer.

Alternatively, the disclosed homogenized formulations can be prepared in a powdered form (e.g., via spray drying or dehydration) and contained in articles such as sachets or shakers, which can be used to pour or sprinkle the disclosed compositions onto and into food and beverages. Still other examples include baked goods (e.g., breads, rolls, cookies, crackers, fruit pies, or cakes), pastas, condiments, salad dressings, soup mixes, snack foods, processed fruit juices, sauces, gravies, syrups, beverages, dry beverage powders, jams or jellies, or pet companion food that have been prepared with a homogenized formulation as disclosed herein.

In one aspect, disclosed herein are methods of delivering a loading substance to a subject by administering to the subject a homogenized formulation as disclosed herein. In a particular example, the disclosed homogenized formulations (including foodstuffs that contain or were prepared with the disclosed homogenized formulations) can be used as a source of fatty acids (e.g., omega-3 fatty acids), lowering triglycerides and influencing diabetes related biochemistry. In another particular example, disclosed herein are methods of supplementing omega-3 fatty acids in a subject by administering an effective amount of a homogenized formulation disclosed herein, wherein the loading substance comprises an omega-3 fatty acid. In another example, disclosed herein are methods of lowering cholesterol levels, triglyceride levels, or a combination thereof in a subject by administering an effective amount of a homogenized formulation disclosed herein.

Omega-3 fatty acids are vital to everyday life and function. For example, the beneficial effects of omega-3 fatty acids like cis-5,8,11,14,17-eicosapentaenoic acid (EPA) and cis-4,7,10,13,16,19-docosahexaenoic acid (DHA) on lowering serum triglycerides are well established. These compounds are also known for other cardioprotective benefits such as preventing cardiac arrhythmias, stabilizing atherosclerotic plaques, reducing platelet aggregation, and reducing blood pressure. See e.g., Dyrberg et al., In: Omega-3 Fatty Acids: Prevention and Treatment of Vascular Disease. Kristensen et al., eds., Bi & Gi Publ., Verona-Springer-Verlag, London, pp. 217-26, 1995; O'Keefe and Harris, *Am. J. Cardiology* 2000, 85:1239-41; Radack et al., "The effects of low doses of omega-3 fatty acid supplementation on blood pressure in hypertensive subjects: a randomized controlled trial." *Arch. Intern. Med.* 1991, 151:1173-80; Harris, "Extending the cardiovascular benefits of omega-3 fatty acids." *Curr Atheroscler Rep* 2005, 7:375-80; Holub, "Clinical nutrition: 4 omega-3 fatty acids in cardiovascular care." *CMAJ* 2002, 166(5):608-15. Indeed, the American Heart Association has also reported that omega-3 fatty acids can reduce cardiovascular and heart disease risk. Other benefits of omega-3 fatty acids are those related to the prevention and/or treatment of inflammation and neurodegenerative diseases, and to improved cognitive development. See e.g., Sugano and Michihiro, "Balanced intake of polyunsaturated fatty acids for health benefits." *J. Oleo Sci.* 2001, 50(5): 305-11.

The fatty acids EPA and DHA can be synthesized in the human body from α-linolenic acid (18:3); however, the conversion rate from this precursor molecule is limited (Muskiet et al., "Is docosahexaenoic acid (DHA) essential? Lessons from DHA status regulation, our ancient diet, epidemiology and randomized controlled trials." *J. Nutr.* 2004, 134(1):183-6). Accordingly, EPA and DHA in the body are primarily derived from dietary sources (e.g., oily fish). Diets rich in fish oils are known to have many beneficial effects for heart disease, cancer, arthritis, allergies, and other chronic diseases. Epidemiological clinical trials have shown that increasing the dietary intake of omega-3 fatty acids, in the form of fish or of fish oil supplements, may reduce various risk factors associated with cardiovascular disease. See e.g., The American Heart Association, Scientific Statement, "Fish Consumption, Fish Oil, Omega-3 Fatty Acids and Cardiovascular Disease," November 2002; Appel et al., "Does supplementation of diet with 'fish oil' reduce blood pressure? A meta-analysis of controlled clinical trials." *Arch. Intern. Med.* 1993, 153(12):1429-1438; GISSI-Prevenzione Investigators. "Dietary supplementation with omega-3 polyunsaturated fatty acids and vitamin E after myocardial infarction: results of the GISSI-Prevenzione trial." *Lancet* 1999, 354:447-55.

Despite the strong evidence for the benefit of omega-3 fatty acids like EPA and DHA in prevention of cardiovascular disease, the average daily consumption of these fatty acids by North Americans is estimated to be between 0.1 to 0.2 grams, compared to a suggested daily intake of 0.65 grams to confer benefit (Webb, "Alternative sources of omega-3 fatty acids." *Natural Foods Merchandiser* 2005, XXVI(8):40-4). Since altering dietary patterns of populations is difficult and many people do not like to eat fish, dietary supplementation with EPA and DHA is an important approach to addressing this problem. Unfortunately, many supplements of omega-3 fatty acids are sensitive to oxidation and can be foul smelling and tasting. Further, compliance with dietary supplement regimens requires discipline, which is often wanting. In light of the health benefits of omega-3 fatty acids, the disclosed formulations comprising microcapsules can be used to deliver omega-3 fatty acids to a subject. In the disclosed methods of use, the homogenized formulations that are administered can be any of the formulations disclosed herein.

When used in the above described methods or other treatments, an "effective amount" of one of the disclosed homogenized formulations (or one of the loading substances therein) can be employed in pure form or, where such forms exist, in pharmaceutically acceptable salt form, foodstuff, or other form.

The specific effective dose level for any particular subject will depend upon a variety of factors including the disorder being treated and the severity of the disorder; the identity and activity of the specific composition employed; the age, body weight, general health, sex and diet of the patient; the time of administration; the route of administration; the rate of excretion of the specific composition employed; the duration of the treatment; drugs used in combination or coincidental with the specific composition employed and like factors well known in the medical arts. For example, it is well within the skill of the art to start doses of a composition at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose.

The dosage can be adjusted by the individual physician or the subject in the event of any counterindications. Dosage can vary, and can be administered in one or more dose administrations daily, for one or several days. Guidance can be found in the literature for appropriate dosages for given classes of pharmaceutical products.

Further, disclosed are methods for delivering a disclosed composition to a subject by administering to the subject any of the homogenized formulations or foodstuffs disclosed herein. The disclosed homogenized formulations and foodstuff made therefrom can typically be administered orally.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, pH, etc.) but some errors and deviations should be accounted for. Unless indicated otherwise, parts are parts by weight, temperature is in ° C. or is at ambient temperature, and pressure is at or near atmospheric. There are numerous variations and combinations of conditions, e.g., component concentrations, temperatures, pressures, and other reaction ranges and conditions that can be used to optimize the product purity and yield obtained from the described process. Only reasonable and routine experimentation will be required to optimize such process conditions.

Certain materials, compounds, compositions, and components disclosed herein can be obtained commercially or readily synthesized using techniques generally known to those of skill in the art. For example, the starting materials and reagents used in preparing the disclosed compositions are either available from commercial suppliers such as Ocean Nutrition Canada, Ltd. (Dartmouth, Canada), Aldrich Chemical Co. (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Example 1

To verify that the homogenization process did not cause damage to the integrity of the microcapsules in milk, an experiment was performed using a laboratory scale two-stage high-pressure homogenizer (Invensys APV1000 homogenizer, from Ivensys APV Getzville, N.Y.). A milk composition containing about 8% by weight of microcapsules (1812TG Omega-3 microcapsules from Ocean Nutrition Canada, Dartmouth, Canada) was prepared and then homogenized with the homogenizer. The operating pressures of the homogenizer were 3,000, 6,000, 9,000 and 12,000 psi. A Beckman Coulter Particle size analyzer was used to investigate the survivability of the microcapsules through homogenization.

The particle size distribution curves of the processed compositions are in FIG. 1. The graph shows that as the operating pressure increases, the distributions shift to a smaller size range. While not wishing to be bound by theory, it is believed that this is evidence of damage to some microcapsules caused by homogenization at such severe operating conditions. However, this also demonstrates that contrary to initial assumptions, the majority of the particles do survive intact even under moderately high pressure homogenization conditions. For example in FIG. 1, no dramatic changes are seen in the size distribution at 3,000 psi.

Example 2

Milk compositions containing two lots of multicore microcapsules (lot 1 having a particle size of 20-40 μm diameter and lot 2 having a particle size of 40-70 μm diameter) were homogenized at variable pressures. Tests were run at up to 4,000 psi total homogenization pressure (in-line with many commercial systems). Typically, a second stage homogenization at about 500 psi was also applied.

Figure 2:
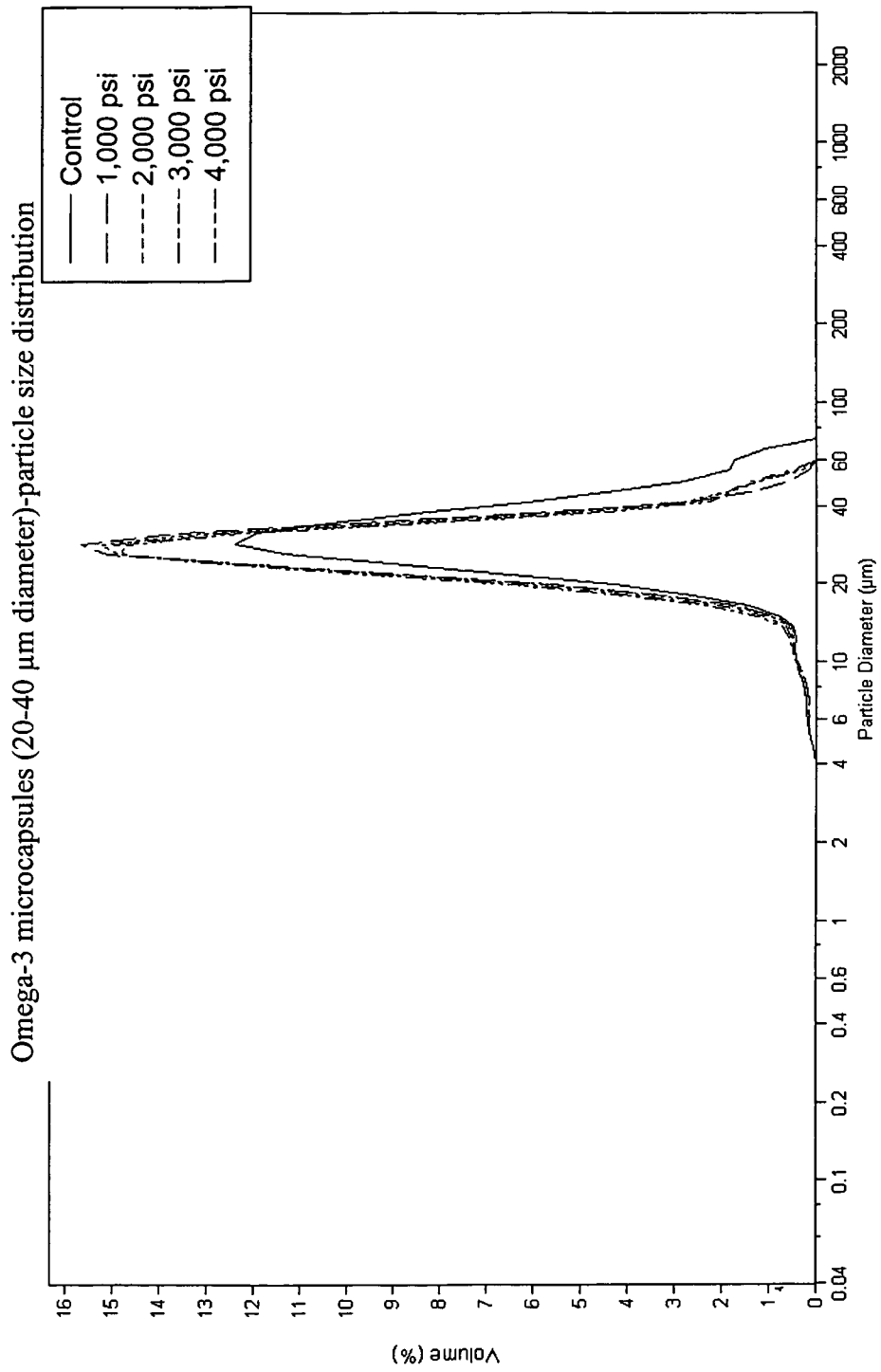
FIG. 2 is a graph of particle size distribution of a lot of microcapsules with 20-40 µm diameter after homogenization with a two-stage homogenizer operating at 1000, 2000, 3000, or 4000 psi and then at 500 psi.
Figure 3:
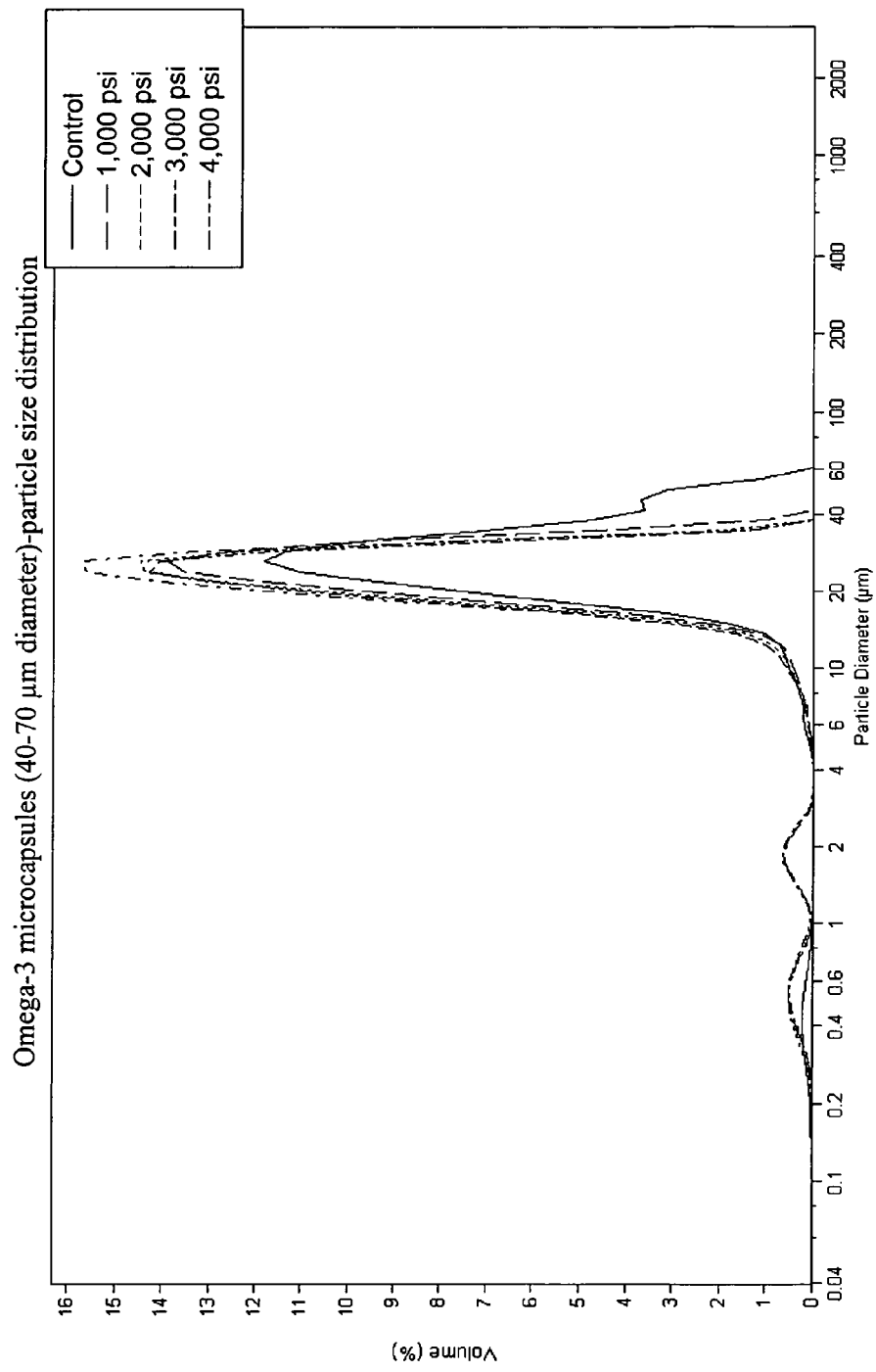
FIG. 3 is a graph of particle size distribution of a lot of microcapsules with 40-70 µm diameter after homogenization with a two-stage homogenizer operating at 1000, 2000, 3000, or 4000 psi and then at 500 psi.

The particle size distribution curves (FIGS. 2 and 3) show that there is very little change in the particle size distribution from about 1,000 and 4,000 psi, indicating that little to no damage is occurring. However, there is a change between the control and the homogenized samples in the largest particles (which represent only a small portion of the total). These particles disappear on homogenization even at the lowest pressure. While not wishing to be bound by theory, one interpretation is that this is due to disassociation of aggregated particles and not fragmentation of individual microcapsules. The latter would be expected to be somewhat pressure dependent, as was seen for larger particles. In contrast, aggregates are weakly bound and even low pressure will break them into individual intact particles.

The remarkable similarity of the curves over the pressure ranges tested indicates that the microcapsules can be considered inert to homogenization at up to at least 4,000 psi. It is also noted that certain microcapsules disclosed herein are even more robust than the particles used in this study (e.g., particles crosslinked to a greater extent that those used in this study would be expected to be more robust). Thus, it is likely that larger particle sizes can survive similar pressure homogenization than has been shown in this example.

Example 3: Vanilla Frozen Yogurt

Vanilla frozen yogurt was made in order to evaluate the sensory stability of frozen yogurt containing microencapsulated omega-3 fatty acids (MEG-3™ powder from Ocean Nutrition Canada, Ltd.; Dartmouth, Canada). Specifically, three batches of frozen yogurt were prepared according to the formulation in Table 4. The three batches were (1.) a control containing no microcapsules, (2.) a batch in which the microcapsules (200 mg EPA+DHA/serving) were added prior to homogenization, and (3.) a batch in which the microcapsules (200 mg EPA+DHA/serving) were added after homogenization.

TABLE 4

Formulation for Vanilla Frozen Yogurt

| Ingredients | Quantity (kg) | Weight (%) |
|---|---|---|
| Skim milk | 8.41 | 27.76 |
| Water | 6.73 | 22.22 |
| Yogurt | 6.00 | 19.81 |
| Sugar | 4.50 | 15.31 |
| Skim Milk Powder | 2.72 | 8.98 |
| Cream (35% m.f.) | 1.46 | 4.82 |
| Stabilizer Blend (GS1143)* | 0.11 | 0.35 |
| Vanilla Flavoring | 0.08 | 0.25 |
| MEG-3 ™ powder | 0.245 | 0.97 |
| Total | 30.24 | 100.00 |

Samples from each batch were evaluated initially and after 2 months of storage. The samples containing microcapsules added prior to homogenization were preferred.

Further, samples containing microcapsules added prior to homogenization were stored in opened containers and tested monthly for odor, flavor, color and mouthfeel. These samples were denser than the control and also had a darker color; this remained constant throughout shelf life. Only after 7 months were fishy off-noted detected.

After the 7 month period, other containers of frozen yogurt containing microcapsules added prior to homogenization were opened monthly for the remainder of the shelf life (12 months). These samples were also evaluated based on odor, flavor, color and mouthfeel. No off flavors or odors were detected in these samples from month 8 through 11. The samples were more dense and darker than the control. Not until after 11 months of storage in open containers were off flavors detected and these off flavors were not fishy. This experiment demonstrates that frozen yogurt containing microencapsulated omega-3 fatty acids are surprisingly stable.

Example 4: Strawberry Yogurt Smoothie

A Strawberry Yogurt Smoothie (serving size of 8 fl oz; about 226 g) incorporating microencapsulated omega-3 fatty acids (1812TG Omega-3 powder from Ocean Nutrition Canada, Ltd., Dartmouth, Canada) was prepared according to the formulation in Table 5. The product had a 130 mg dosage of EPA+DHA per serving.

TABLE 5

Formulation for Strawberry Yogurt Smoothie

| Ingredients | Weight (g) | Weight % |
|---|---|---|
| Plain Yogurt | 438.24 | 43.82 |
| Strawberry Puree, Seedless | 110.62 | 11.06 |
| Water | 299.78 | 29.98 |
| Liquid Fructose | 143.81 | 14.38 |
| Strawberry Flavour | 0.93 | 0.093 |
| Red Colour | 0.02 | 0.002 |
| Dipotassium Phosphate | 1.33 | 0.133 |
| Omega-3 | 3.83 | 0.383 |
| Pectin | 1.44 | 0.144 |
| Total | 1000.00 | 100.00 |

Specifically, strawberry puree, water, liquid fructose, strawberry flavor, and red color were mixed together in a pot. Dipotassium phosphate, pectin, and the microcapsules were then added to the wet ingredients. The mixture was heated to 88° C. and then cooled to room temperature. Yogurt was added next and the mixture was again heated to 88° C. The mixture was then homogenized at a total pressure of 2,500 psi (first stage at 2,000 psi and second stage at 500 psi). The homogenized formulation was then placed into bottles and stored refrigerated until use.

A second smoothie was prepared according to the formulation in Table 6. Specifically, 1% milk, starch, gelatin, and whey protein were mixed together. The microcapsules were then sprinkled over the surface and allowed to hydrate for 5 minutes. The mixture was then heated to 55° C. and homogenized at a total pressure of 2,300 psi (first stage at 1,800 psi and second stage at 500 psi). The homogenized formulation was then pasteurized at 86° C. for 30 minutes and cooled to 38° C. Yogurt culture mixed with 2% milk was added to the homogenized/pasteurized formulation and incubated at 38° C. for approximately 10 hours, or until the mixture reached a pH of 4.5. The resulting mixture was then mixed with a fruit preparation and heated to 88° C. Then, the mixture was again homogenized at a total pressure of 2,500 psi (first stage at 2,000 psi and second stage at 500 psi). The mixture was chilled and stored refrigerated until ready to use.

TABLE 6

Formulation for Strawberry Yogurt Smoothie

| Ingredients | Weight (g) | Weight % |
|---|---|---|
| Milk, 1% milk fat | 428.87 | 42.89 |
| Starch | 5.71 | 0.57 |
| Whey Protein Isolate | 1.99 | 0.20 |
| Milk, 2% milk fat | 1.64 | 0.16 |
| Gelatin | 1.19 | 0.12 |
| Yo-Fast 17, yogurt culture | 0.13 | 0.01 |
| Strawberry fruit prep | 556.64 | 55.66 |
| Omega-3 | 3.83 | 0.383 |
| Total | 1000.00 | 100.00 |

Both processes produced smoothies with acceptable flavor, odor, and texture.

Example 5: Addition of Various Amounts of Microcapsules to Yogurt

Microencapsulated omega-3 fatty acids (1812TG Omega-3 microcapsules from Ocean Nutrition Canada, Ltd., Dartmouth, Canada) was added to plain yogurt at 0 mg (control), 50 mg (Test 1), 112 mg (Test 2), and 150 mg (Test 3) EPA+DHA per serving of plain yogurt (175 g). The four batches of yogurt (6.5 L each) were prepared according to the formulations in Tables 7-10.

TABLE 7

Original recipe ingredients for the plain yogurt

| Ingredients | Quantity (g) |
| --- | --- |
| 2% Milk | 24.31 |
| 1% Milk | 6332.95 |
| Starch Thermo Flo | 84.5 |
| Whey Protein Concentrate 80% | 32.5 |
| Culture Yo-Fast 17 | 1.69 |
| Gelatin | 24.05 |
| Total | 6500 g |

TABLE 8

Recipe with microcapsules at 50 mg Omega-3s per serving

| Ingredients | Quantity (g) |
| --- | --- |
| 2% Milk | 24.31 |
| 1% Milk | 6332.95 |
| Starch Thermo Flo | 84.5 |
| Whey Protein Concentrate 80% | 32.5 |
| Culture Yo-Fast 17 | 1.69 |
| Gelatin | 24.05 |
| Omega-3 Powder (1812TG) | 12.30 |
| Total | 6512.3 g |

TABLE 9

Recipe with microcapsules at 112 mg Omega-3s per serving

| Ingredients | Quantity (g) |
| --- | --- |
| 2% Milk | 24.31 |
| 1% Milk | 6332.95 |
| Starch Thermo Flo | 84.5 |
| Whey Protein Concentrate 80% | 32.5 |
| Culture Yo-Fast 17 | 1.69 |
| Gelatin | 24.05 |
| Omega-3 Powder (1812TG) | 27.6 |
| Total | 6527.6 g |

TABLE 10

Recipe with microcapsules at 150 mg Omega-3s per serving

| Ingredients | Quantity (g) |
| --- | --- |
| 2% Milk | 24.31 |
| 1% Milk | 6332.95 |
| Starch Thermo Flo | 84.5 |
| Whey Protein Concentrate 80% | 32.5 |
| Culture Yo-Fast 17 | 1.69 |
| Gelatin | 24.05 |
| Omega-3 Powder (1812TG) | 37.1 |
| Total | 6537.1 g |

Specifically, milk (1%), starch, gelatin, and whey protein concentrate were mixed together in a 7 L stainless steel container. The containers were placed in a batch pasteurization unit (from Highland Equipment Company, Mississauga, Ontario). The microcapsules (in Test 1, 2, and 3) were sprinkled on the mixture and allowed to wet for approximately 5 minutes. The agitators were then turned on and the samples were heated to 55° C. in the pasteurization unit prior to homogenization. When this temperature was attained, each 6.5 L batch was placed in the hopper of a two-stage homogenizer and underwent a total homogenization pressure of 1,800 psi. The homogenizer used was a Cherry Burrell Superhomogenizer with a maximum capacity of 500 L/hour and a maximum pressure of 3,000 psi. After homogenization, the samples were moved back to the pasteurization unit where the batches were pasteurized at 86° C. for 30 minutes. The samples containing the microcapsules produced more foam during pasteurization than the control. The samples were then cooled to 40° C. prior to inoculation.

A batch of culture was produced by mixing 16.9 g of Chris Hansen Culture Yo-Fast 17 pellets with 100 mL of 2% UHT milk. The pellets dissolve almost immediately when mixed with milk. Ten milliliters of the culture solution was pipetted into each batch. The samples were then placed in a Foster incubator at 40° C. and ambient relative humidity for 4 hours until the pH dropped to 4.5. The samples were placed back in the pasteurization unit for cooling to 5° C. Next, the yogurt was hand stirred and poured into 150 g polypropylene cups. The yogurt could be stirred with large agitators instead of by hand and/or pushed through screens to break up any lumps. The yogurt was then put in a refrigerator at 5° C.

Example 6: Addition of Various Amounts of Microcapsules to Milk

Microencapsulated fish oil (1812TG Omega-3 microcapsules from Ocean Nutrition Canada, Ltd., Dartmouth, Canada) was added to milk at 0 mg (control), 50 mg (Test 1), 112 mg (Test 2), and 150 mg (Test 3) EPA+DHA per serving of 1% white milk (250 g). There were two batches of milk produced with 150 mg microcapsules (50 μm particle size). The five batches of milk were prepared according to the formulations in Tables 11-14.

TABLE 11

Original recipe ingredients for the 1% Milk

| Ingredients | Quantity (g) |
| --- | --- |
| 1% Milk | 14000 |
| Total | 14000 g |

TABLE 12

Recipe with microcapsules at 50 mg Omega-3s per serving

| Ingredients | Quantity (g) |
| --- | --- |
| 1% Milk | 14000 |
| Omega-3 Powder (1812TG) | 18.7 |
| Total | 14018.7 g |

TABLE 13

Recipe with microcapsules at 112 mg Omega-3s per serving

| Ingredients | Quantity (g) |
| --- | --- |
| 1% Milk | 14000 |
| Omega-3 Powder (1812TG) | 41.8 |
| Total | 14041.8 g |

TABLE 14

Recipe with microcapsules at 150 mg Omega-3s per serving (two batches)

| Ingredients | Quantity (g) |
| --- | --- |
| 1% Milk | 14000 |
| Omega-3 Powder (1812TG) | 56.0 |
| Total | 14056.0 g |

Specifically, 70 kilograms of whole milk was obtained from local farmers in order to have milk that has not been previously pasteurized or homogenized. The cream was separated from the milk in order to produce a 1% milk product. The milk was heated to 40° C. to aid in separation. The cream was divided from the milk on a Viking Separator. The content of fat in the skim milk was 0.25%. The content of fat in the cream was estimated at 25%. The 25% cream (2.15 kg) was blended with the skim milk (71.5 kg) to produce 1% milk.

The milk was separated into 14 L batches. For the four batches of milk containing microcapsules, the microcapsules were sprinkled into the milk prior to heating the milk for homogenization. The microcapsules were allowed to sit for approximately 15 minutes prior to stirring with a wire whisk. This allowed the microcapsules to be completely dispersed without clumping. The batches were heated to 55° C. and then homogenized at 2,500 psi in a Cherry Burrell Super-homogenizer. After homogenization the milk was transferred in stainless steel containers to the UHT Cherry Burrell No-BAC UNITHERM IV for pasteurization. The temperature of the heating coil in the pasteurization unit was adjusted with water to a temperature of 73° C. prior to beginning the milk experiments. The milk was placed in a hopper and it was pumped to a holding pump, which displaces a volume of milk every 20 seconds into the heating coil for pasteurization. The milk was pasteurized at 73° C. for 20 seconds and then cooled to 10° C. The product exited through a stainless steel pipe into a 500 mL HDPE container inside a laminar flow hood, which inhibits contamination from occurring. HDPE caps were placed on the containers, which were stored at 4° C.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing a homogenized formulation, comprising:
   (a) providing a pre-homogenized composition comprising an initial particle size distribution of encapsulated agglomeration microcapsules, wherein each microcapsule comprises an agglomeration of primary microcapsules and a loading substance, each individual primary microcapsule having a primary shell, wherein the loading substance is encapsulated by the primary shell, wherein the agglomeration is encapsulated by an outer shell, wherein the primary shell, the outer shell, or both the primary and outer shells comprise a complex coacervate, and wherein the loading substance comprises a hydrophobic liquid; and
   (b) conducting pressure-based homogenization of the pre-homogenized composition at pressures of about 6,000 psi or less to thereby provide a homogenized formulation having a final particle size distribution of the microcapsules which is more narrow than the initial particle size distribution of the microcapsules in the pre-homogenized composition.

2. The method of claim 1, wherein the pressure-based homogenization of step (b) is conducted by passing the pre-homogenized composition in multiple passes through a multi-stage homogenizer and subjecting the pre-homogenized composition during each of the multiple passes to pressure-based homogenization at a pressure of 6,000 psi or less.

3. The method of claim 1, wherein the pressure-based homogenization is conducted by a high pressure homogenizer or a very high pressure homogenizer.

4. The method of claim 1, wherein the pressure-based homogenization is from about 3,000 to about 6,000 psi.

5. The method of claim 1, further comprising pasteurizing the pre-homogenized composition.

6. The method of claim 1, further comprising pasteurizing the homogenized formulation.

7. The method of claim 1, wherein the pre-homogenized composition comprises a comestible, cosmetic, pharmaceutical, nutritional, or health care product.

8. The method of claim 1, wherein the pre-homogenized composition comprises a dairy product.

9. The method of claim 1, wherein the pre-homogenized composition comprises an infant formula.

10. The method of claim 1, wherein the pre-homogenized composition comprises a soy product.

11. The method of claim 1, wherein the primary shell, the outer shell, or both the primary and outer shells comprise a surfactant, gelatin, polyphosphate, polysaccharide, or a mixture thereof.

12. The method of claim 1, wherein the primary shell, the outer shell, or both the primary and outer shells comprise gelatin type A, gelatin type B, polyphosphate, gum arabic, alginate, chitosan, carrageenan, pectin, starch, modified starch, alfa-lactalbumin, beta-lactoglobumin, ovalbumin, polysorbiton, maltodextrin, cyclodextrin, cellulose, methyl cellulose, ethyl cellulose, hydropropylmethylcellulose, carboxymethylcellulose, milk protein, whey protein, soy protein, canola protein, albumin, kosher gelatin, non-kosher gelatin, Halal gelatin, non-Halal gelatin, or a mixture thereof.

13. The method of claim 1, wherein the primary shell, the outer shell, or both the primary and outer shells comprise fish gelatin.

14. The method of claim 1, wherein the primary shell, the outer shell, or both the primary and outer shells comprise pork gelatin.

15. The method of claim 1, wherein the primary shell, the outer shell, or both the primary and outer shells comprise a gelatin with a Bloom number of from about 0 to about 50.

16. The method of claim 1, wherein the primary shell, the outer shell, or both the primary and outer shells comprise a gelatin with a Bloom number of from about 51 to about 300.

17. The method of claim 1, wherein the primary shell, the outer shell, or both the primary and outer shells comprise a gelatin with a Bloom number of about 0, about 210, about 220, or about 240.

18. The method of claim 1, wherein the complex coacervate is a complex coacervate of gelatin and polyphosphate.

19. The method of claim 1, wherein the loading substance comprises a biologically active substance or a nutritional supplement.

20. The method of claim 1, wherein the loading substance comprises one or more oils chosen from a microbial oil, algal oil, fungal oil, and plant oil.

21. The method of claim 1, wherein the loading substance comprises fish oil.

22. The method of claim 21, wherein the fish oil comprises an Atlantic fish oil, Pacific fish oil, Mediterranean fish oil, light pressed fish oil, alkaline treated fish oil, heat treated fish oil, light and heavy brown fish oil, bonito oil, pilchard oil, tuna oil, sea bass oil, halibut oil, spearfish oil, barracuda oil, cod oil, menhaden oil, sardine oil, anchovy oil, capelin oil, Atlantic cod oil, Atlantic herring oil, Atlantic mackerel oil, Atlantic menhaden oil, salmonid oil, or shark oil.

23. The method of claim 1, wherein the loading substance comprises an omega-3 fatty acid, and ester of an omega-3 fatty acid, and/or a mixture thereof.

24. The method of claim 23, wherein the ester of an omega-3 fatty acid comprises an alkyl ester of an omega-3 fatty acid, a monoglyceride of an omega-3 fatty acid, a diglyceride of an omega-3 fatty acid, a triglyceride ester of an omega-3 fatty acid, a phytosterol ester of an omega-3 fatty acid, an ester of an omega-3 fatty acid and an antioxidant, a furanoid ester of an omega-3 fatty acid, and/or a mixture thereof.

25. The method of claim 1, wherein the loading substance comprises docosahexaenoic acid and/or eicosapentaenoic acid, a C1-C6 alkyl ester thereof, a triglyceride ester thereof, a phytosterol ester thereof, and/or a mixture thereof.

26. The method of claim 1, wherein the outer shell has an average diameter of from about 1 μm to about 2,000 μm.

27. The method of claim 1, wherein the primary shell has an average diameter of from about 40 nm to about 10 μm.

28. The method of claim 1, wherein the loading substance is from about 20% to about 90% by weight of the microcapsule.

29. The method of claim 1, wherein the encapsulated agglomeration microcapsules are prepared by a process comprising:
(i) providing an emulsion comprising a first polymer component and the loading substance;
(ii) adding a second polymer component to the emulsion;
(iii) adjusting pH, temperature, concentration, mixing speed, or a combination thereof to form an aqueous mixture comprising the primary shell material, wherein the primary shell material comprises the first and second polymer components and surrounds the loading substance;
(iv) cooling the aqueous mixture to a temperature above the gel point of the primary shell material until the primary shell material forms agglomerations; and
(v) further cooling the aqueous mixture to form the outer shell around the agglomeration.

30. The method of claim 29, comprising adding an antioxidant to the emulsion and/or the aqueous mixture.

31. The method of claim 30, wherein the antioxidant comprises ascorbic acid, citric acid, or a salt thereof.

32. The method of claim 29, wherein step (iv) is practiced by cooling the aqueous mixture at a cooling rate of about 1° C. per about 1 to about 100 minutes.

33. The method of claim 32, wherein the cooling rate is about 1° C. per 5 minutes.

34. The method of claim 29, wherein step (iv) is practiced by cooling the mixture until the mixture reaches a temperature of from about 5° C. to about 10° C.

35. The method of claim 29, further comprising step (e) adding a cross-linker to cross-link the shell material.

36. The method of claim 35, wherein the cross-linker is an enzymatic cross-linker, an aldehyde, tannic acid, alum, or a mixture thereof.

37. The method of claim 35, wherein the cross-linker is gluteraldehyde.

38. The method of claim 35, wherein the cross-linker is transglutaminase.

* * * * *